US00RE50767E

(19) United States
(12) Reissued Patent
Nagel et al.

(10) Patent Number: US RE50,767 E
(45) **Date of Reissued Patent: *Jan. 27, 2026**

(54) APPARATUS AND METHOD FOR GENERATING A SYNTHESIS AUDIO SIGNAL AND FOR ENCODING AN AUDIO SIGNAL

(71) Applicant: Fraunhofer-Gesellschaft zur Foerderung der angewandten Forschung e.V., Munich (DE)

(72) Inventors: Frederik Nagel, Nuremberg (DE); Markus Multrus, Nuremberg (DE); Jérémie Lecomte, Fuerth (DE); Stefan Bayer, Nuremberg (DE); Guillaume Fuchs, Bubenreuth (DE); Johannes Hilpert, Nuremberg (DE); Julien Robilliard, Nuremberg (DE)

(73) Assignee: Fraunhofer-Gesellschaft zur Foerderung der angewandten Forschung e.V., Munich (DE)

( * ) Notice: This patent is subject to a terminal disclaimer.

(21) Appl. No.: 17/848,244

(22) Filed: Jun. 23, 2022

Related U.S. Patent Documents

Reissue of:
(64) Patent No.: 9,076,433
Issued: Jul. 7, 2015
Appl. No.: 13/687,678
Filed: Nov. 28, 2012

U.S. Applications:
(60) Division of application No. 17/846,565, filed on Jun. 22, 2022, now Pat. No. Re. 50,601, which is an (Continued)

(30) Foreign Application Priority Data

Dec. 30, 2009 (EP) ..... 09181008

(51) Int. Cl.
*G10L 19/00* (2013.01)
*G10L 19/008* (2013.01)
(Continued)

(52) U.S. Cl.
CPC ..... *G10L 19/008* (2013.01); *G10L 19/18* (2013.01); *G10L 21/038* (2013.01); *G10L 19/02* (2013.01)

(58) Field of Classification Search
CPC ..... G10L 19/008; G10L 19/18; G10L 21/038; G10L 19/02; G10L 21/04
See application file for complete search history.

(56) References Cited

U.S. PATENT DOCUMENTS 5,127,054 A 6/1992 Hong et al.
5,950,153 A 9/1999 Ohmori et al.
(Continued)

FOREIGN PATENT DOCUMENTS

AU 2003243441 12/2003
AU 2003243441 A1 12/2003
(Continued)

OTHER PUBLICATIONS

"Information technology—Coding of moving pictures and associated audio for digital storage media at up to about 1,5 Mbit/s—Part 3: Audio", ISO/IEC 11172-3 First Edition, Aug. 1, 1993, 158 pages.
(Continued)

*Primary Examiner* — Rachna S Desai
(74) *Attorney, Agent, or Firm* — Perkins Coie LLP; Michael A. Glenn

(57) ABSTRACT

An apparatus for generating a synthesis audio signal using a patching control signal has a first converter, a spectral domain patch generator, a high frequency reconstruction manipulator and a combiner. The first converter is configured for converting a time portion of an audio signal into a (Continued)

(AUDIO SIGNAL SYNTHESIZER)

(SPECTRAL DOMAIN PATCH GENERATOR)

spectral representation. The spectral domain patch generator is configured for performing a plurality of different spectral domain patching algorithms, wherein each patching algorithm generates a modified spectral representation having spectral components in an upper frequency band derived from corresponding spectral components in a core frequency band of the audio signal. The spectral domain patch generator is furthermore configured to select a first spectral domain patching algorithm from the plurality of patching algorithms for a first time portion and a second spectral domain patching algorithm from the plurality of patching algorithm for a second different time portion in accordance with the patching control signal to obtain the modified spectral representation.

6 Claims, 13 Drawing Sheets

Related U.S. Application Data application for the reissue of Pat. No. 9,076,433, which is a continuation of application No. 13/107,687, filed on May 13, 2011, now Pat. No. 8,386,268, which is a continuation of application No. PCT/EP2010/054434, filed on Apr. 1, 2010.

(60) Provisional application No. 61/168,068, filed on Apr. 9, 2009.

(51) Int. Cl.

| | |
|---|---|
| ***G10L 19/18*** | (2013.01) |
| ***G10L 21/038*** | (2013.01) |
| *G10L 19/02* | (2013.01) |

(56) References Cited

U.S. PATENT DOCUMENTS

| | | | | |
|---|---|---|---|---|
| 6,138,093 | A | 10/2000 | Ekudden et al. | |
| 6,549,884 | B1 | 4/2003 | Laroche et al. | |
| 6,708,145 | B1 | 3/2004 | Liljeryd et al. | |
| 6,895,375 | B2 | 5/2005 | Malah et al. | |
| 7,139,702 | B2 * | 11/2006 | Tsushima et al. | 704/222 |
| 7,260,520 | B2 | 8/2007 | Henn et al. | |
| 7,308,401 | B2 * | 12/2007 | Tsushima et al. | 704/219 |
| 7,509,254 | B2 * | 3/2009 | Tsushima et al. | 704/222 |
| 7,742,927 | B2 | 6/2010 | Philippe et al. | |
| 7,783,496 | B2 * | 8/2010 | Tsushima et al. | 704/500 |
| 7,864,843 | B2 | 1/2011 | Choo et al. | |
| 8,112,284 | B2 | 2/2012 | Kjorling et al. | |
| 8,781,844 | B2 * | 7/2014 | Laaksonen et al. | 704/500 |
| 8,788,276 | B2 * | 7/2014 | Neuendorf | G10L 21/038 704/502 |
| 8,818,541 | B2 * | 8/2014 | Villemoes et al. | 700/94 |
| 8,880,410 | B2 * | 11/2014 | Nagel | G10L 21/038 704/500 |
| 9,076,433 | B2 | 7/2015 | Nagel et al. | |
| 9,697,838 | B2 | 7/2017 | Nagel et al. | |
| 10,522,156 | B2 | 12/2019 | Nagel et al. | |
| 10,909,994 | B2 | 2/2021 | Nagel et al. | |
| 2002/0016698 | A1 | 2/2002 | Tokuda | |
| 2002/0118845 | A1 | 8/2002 | Henn et al. | |
| 2004/0028244 | A1 | 2/2004 | Tsushima et al. | |
| 2004/0078205 | A1 | 4/2004 | Liljeryd et al. | |
| 2004/0125878 | A1 | 7/2004 | Liljeryd et al. | |
| 2004/0138876 | A1 | 7/2004 | Kallio et al. | |
| 2004/0174911 | A1 | 9/2004 | Kim et al. | |
| 2005/0096917 | A1 | 5/2005 | Kjorling et al. | |
| 2005/0246164 | A1 | 11/2005 | Ojala et al. | |
| 2006/0267825 | A1 | 11/2006 | Fujiyama et al. | |
| 2007/0238415 | A1 | 10/2007 | Sinha et al. | |
| 2007/0282599 | A1 | 12/2007 | Choo et al. | |
| 2008/0120116 | A1 | 5/2008 | Schnell et al. | |
| 2009/0041111 | A1 | 2/2009 | Liljeryd et al. | |
| 2009/0107322 | A1 | 4/2009 | Akiyama | |
| 2009/0319259 | A1 | 12/2009 | Liljeryd et al. | |
| 2009/0319280 | A1 | 12/2009 | Liljeryd et al. | |
| 2010/0114583 | A1 | 5/2010 | Lee et al. | |
| 2010/0250261 | A1 | 9/2010 | Laaksonen et al. | |
| 2010/0274555 | A1 | 10/2010 | Laaksonen et al. | |
| 2010/0280834 | A1 | 11/2010 | Tsushima et al. | |
| 2010/0292994 | A1 | 11/2010 | Lee et al. | |
| 2011/0019838 | A1 | 1/2011 | Kaulberg et al. | |
| 2011/0173006 | A1 | 7/2011 | Nagel et al. | |
| 2011/0264457 | A1 | 10/2011 | Oshikiri et al. | |
| 2012/0275607 | A1 | 11/2012 | Kjoerling et al. | |
| 2012/0328121 | A1 | 12/2012 | Truman et al. | |

FOREIGN PATENT DOCUMENTS

| | | | |
|---|---|---|---|
| EP | 1367566 | | 12/2003 |
| EP | 1300833 | | 11/2006 |
| EP | 1970900 | | 9/2008 |
| EP | 1970900 | A1 | 9/2008 |
| JP | 2002082685 | | 3/2002 |
| JP | 2002082685 | A | 3/2002 |
| JP | 2199157 | | 2/2003 |
| JP | 2003216190 | | 7/2003 |
| JP | 2004517358 | | 6/2004 |
| JP | 2004517358 | A | 6/2004 |
| JP | 2005521907 | | 7/2005 |
| JP | 2005530206 | | 10/2005 |
| RU | 2199157 | C2 | 2/2003 |
| RU | 2007116941 | | 11/2008 |
| RU | 2007116941 | A | 11/2008 |
| WO | 9857436 | A2 | 12/1998 |
| WO | WO-98/57436 | | 12/1998 |
| WO | 0182289 | | 11/2001 |
| WO | WO-01082289 | | 11/2001 |
| WO | WO-02/052545 | | 7/2002 |
| WO | WO-02/056301 | | 7/2002 |
| WO | WO-03/107329 | | 12/2003 |

OTHER PUBLICATIONS

Dietz, Martin , et al., "Spectral Band Replication, a Novel Approach in Audio Coding", Engineering Society Convention 121, Audio Engineering Society Paper 5553, May 10, 2002, pp. 1-8.

Hsu, H , et al., "Audio Patch Method in MPEG-4 HE-AAC Decoder", Presented at the 117th AES Convention. San Francisco, CA, USA., Oct. 28, 2004, 1-11.

Kayhko , "A Robust Wideband Enhancement for Narrowband Speech Signal", Research Report, Helsinki Univ. of Technology, Laboratory of Acoustics and Audio Signal Processing, 75 Pages, 2001, cited in Kallio, Laura, "Artificial Bandwidth Expansion of Narrowband Speech in Mobile Communications Systems", Master's Thesis.

Kayhko, K. , "A Robust Wideband Enhancement for Narrowband Speech Signal", Kayhko, "A Robust Wideband Enhancement for Narrowband Speech Signal", Research Report, Helsinki Univ. of Technology, Laboratory of Acoustics and Audio Signal Processing, 75 Pages, 2001, cited in Kallio, Laura, Artificial Bandwidth Expansion of Narrowband, May 30, 2005, 69 pages.

Den Brinker et al, "An overview of the coding standard MPEG-4 Audio Amendments 1 and 2: HE-AAC, SSC and HE-AAC v2", 2009, in EURASIP J. Audio, Speech, Music Process., vol. 2009, pp. 1-24.*

Hsu , C. M. Liu and W. C. Lee "Audio patch method in audio decoders—MP3 and AAC", 2004, in Proc. AES 116th Conv., pp. 1-14.*

Aarts, et al., "A Unified Approach to Low- and High-Frequency Bandwidth Extension", AES Convention Paper 5921, Presented at the 115th Convention, New York, USA, Oct. 2003, 16 pages.

Dietz, Martin et al., "Spectral Band Replication, a Novel Approach in Audio Coding", 112th AES Convention, Munich, Germany, May 2002, Total of 8 pages.

(56) References Cited

OTHER PUBLICATIONS

Iyengar, V et al., "International Standard ISO/IEC 14496-3:2001/FPDAM 1: Bandwidth Extension", Speech Bandwidth Extension Method and Apparatus, Oct. 2002, 405 pages.
Larsen, et al., "Audio Bandwidth Extension", Chapters 5, 6 and 8; ISBN 0-470-85864-8, copyright 2004, John Wiley & Sons, 2004, 55 pages.
Larsen, et al., "Efficient high-frequency bandwidth extension of music and speech", AES Convention Paper 5627, Presented at the 112th Convention, Munich, Germany, May 2002, 5 pages.
Makhoul, et al., "Spectral Analysis of Speech by Linear Prediction", IEEE Transactions on Audio and Electroacoustics, Jun. 1973, pp. 140-148.
Meltzer, S et al., "SBR enhanced audio codecs for digital broadcasting such as "Digital Radio Mondiale"(DRM)", AES 112th Convention. Munich, Germany, May 2002, 4 pages.
Nagel, et al., "A harmonic bandwidth extension method for audio codecs", ICASSP, IEEE Int'l Conference on Acoustics, Speech and Signal Processing, Taipei, Taiwan, Apr. 2009, 4 pages.
Pulakka, et al., "Evaluation of an Artificial Speech Bandwidth Extension Method in Three Languages", IEEE Transactions on Audio, Speech and Language Processing, vol. 16, No. 6, Aug. 2008, pp. 1124-1137.
Pulakka, et al., "The Effect of Highband Harmonic Structure in the Artificial Bandwidth Expansion of Telephone Speech", Interspeech 2007, Antwerp, Belgium, Aug. 2007, pp. 2497-2500.
Qian, et al., "Combining Equalization and Estimatikon for Bandwidth Extension of Narrowband Speech", ICASSP 2004, 2004, 4 pages.
Schnell, et al., "Enhanced MPEG-4 Low Delay AAC—Low Bitrate High Quality Communication", Presented at the 122nd Convention, Audio Engineering Society, Convention Paper 6998, Vienna, Austria, May 2007, 13 pages.
Ziegler, et al., "Enhancing mp3 with SBR: Features and Capabilities of the new mp3PRO Algorithm", AES Convention Paper 5560, Presented at the 112th Convention, Munich, Germany, May 2002, 7 pages.

* cited by examiner (AUDIO SIGNAL SYNTHESIZER)

(SPECTRAL DOMAIN PATCH GENERATOR)

(BANDWIDTH EXTENSION SCHEME)

(FIRST PATCHING ALGORITHM)

(SECOND PATCHING ALGORITHM)

(THIRD PATCHING ALGORITHM)

(FOURTH PATCHING ALGORITHM)

(AUDIO SIGNAL SYNTHESIZER)

(ENCODER)

(ENCODER)

(SCHEME OF PATCHING IN FREQ. DOMAIN)

APPARATUS AND METHOD FOR GENERATING A SYNTHESIS AUDIO SIGNAL AND FOR ENCODING AN AUDIO SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of copending U.S. patent application Ser. No. 13/107,687, filed May 13, 2011, which is incorporated herein in its entirety by this reference thereto, which is a continuation of copending International Application No. PCT/EP2010/054434, filed Apr. 1, 2010, which is incorporated herein by reference in its entirety, and additionally claims priority from U.S. Provisional Application No. 61/168,068, filed Apr. 9, 2009, and European Application No. 09181008.5, filed Dec. 30, 2009, which are also incorporated herein by reference in their entirety.]

*Notice; More than one reissue application has been filed for the reissue of Pat. No. 9,076,433, the first being reissue application Ser. No. 17/846,565, filed on Jun. 22, 2022, now allowed, the Pat. No. to be assigned, as well as reissue application Ser. No. 17/848,147 (pending), 17/848,163 (allowed, issue fee paid), 17/848,172 (pending), 17/848,196 (pending), 17/848,212 (pending), 17/848,228 (pending), and 17/848,264 (pending), all of which were filed on Jun. 23, 2022 and all of which are divisional reissues of Pat. No. 9,076,433.*

*This application is a divisional reissue application of Ser. No. 17/846,565, filed Jun. 22, 2022, and is also a reissue application of issued U.S. Pat. No. 9,076,433, issued Jul. 7, 2015, which is a continuation of application Ser. No. 13/107,687, filed on May 13, 2011, issued as Pat. No. 8,386,268, on Feb. 26, 2013, which is incorporated herein its entirety by this reference thereto, which is a continuation of international application No. PCT/EP2010/054434, filed on Apr. 1, 2010, which is incorporated herein by reference in its entirety, and additionally claims priority from U.S. provisional application Ser. No. 61/168,068, filed on Apr. 9. 2009, and European Application No. 09181008.5, filed Dec. 30, 2009, which are also incorporated herein by reference in their entirety.*

BACKGROUND OF THE INVENTION

The present invention relates to audio signal processing, and in particular, to an apparatus and a method for generating a synthesis audio signal, an apparatus and a method for encoding an audio signal and an encoded audio signal.

Storage or transmission of audio signals is often subject to strict bit rate constraints. These constraints are usually overcome by an intermediate coding of the signal. In the past, coders were forced to drastically reduce the transmitted audio bandwidth when only a very low bit rate was available. Modern audio codecs are able to code wide-band signals by using bandwidth extension (BWE) methods, as described in M Dietz, L. Liljeryd, K. Kjörling and O. Kunz, "Spectral Band Replication, a novel approach in audio coding" in 112$^{th}$ AES Convention, Munich, May 2002; S. Meltzer, R. Böhm and F. Henn, "SBR enhanced audio codecs for digital broadcasting such as "Digital Radio Mondiale" (DRM)," in 112$^{th}$ AES Convention, Munich, May 2002; T. Ziegler, A. Ehret, P. Ekstrand and M. Lutzky, "Enhancing mp3 with SBR: Features and Capabilities of the new mp3PRO Algorithm," in 112$^{th}$ AES Convention, Munich, May 2002; International Standard ISO/IEC 14496-3:2001/FPDAM 1, "Bandwidth Extension," ISO/IEC, 2002. Speech bandwidth extension method and apparatus Vasu Iyengar et al. U.S. Pat. No. 5,455,888; E. Larsen, R. M. Aarts, and M. Danessis. Efficient high-frequency bandwidth extension of music and speech. In AES 112$^{th}$ Convention, Munich, Germany, May 2002; R. M. Aarts, E. Larsen, and O. Ouweltjes. A unified approach to low-and high frequency bandwidth extension. In AES 115$^{th}$ Convention, New York, USA, October 2003; K. Käyhkö. A Robust Wideband Enhancement for Narrowband Speech Signal. Research Report, Helsinki University of Technology, Laboratory of Acoustics and Audio Signal Processing, 2001; E. Larsen and R. M. Aarts. Audio Bandwidth Extension—Application to psychoacoustics, Signal Processing and Loudspeaker Design. John Wiley & Sons, Ltd, 2004; E. Larsen, R. M. Aarts, and M. Danessis. Efficient high-frequency bandwidth extension of music and speech. In AES 112$^{th}$ Convention, Munich, Germany, May 2002; J. Makhoul. Spectral Analysis of Speech by Linear Prediction. IEEE Transactions of Audio and Electroacoustics, AU-21(3), June 1973; U.S. patent application Ser. No. 08/951,029, Ohmori, et al. Audio band width extending system and method; U.S. Pat. No. 6,895,375, Malah, D & Cox, R. V.: System for bandwidth extension of Narrow-band speech, and Frederik Nagel, Sascha Disch, "A harmonic bandwidth extension method for audio codecs," ICASSP International Conference on Acoustics, Speech and Signal Processing, IEEE CNF, Taipei, Taiwan, April 2009.

These algorithms rely on a parametric representation of the high-frequency content (HF). This representation is generated from the low-frequency part (LF) of the decoded signal by means of transposition into the HF spectral region ("patching") and application of a parameter driven post processing.

In the art, methods of bandwidth extension such as spectral band replication (SBR) are used as an efficient method to generate high frequency signals in an HFR (high frequency reconstruction) based codec.

The spectral band replication (SBR), as described in M Dietz, L. Liljeryd, K. Kjörling and O. Kunz, "Spectral Band Replication, a novel approach in audio coding" in 112$^{th}$ AES Convention, Munich, May 2002, uses a quadrature mirror filterbank (QMF) for generating the HF-information. With the so-called "patching", lower QMF band signals are copied into higher QMF bands, leading to a replication of the information of the LF part in the HF part. The generated HF part is afterwards adapted to the original HF part with the help of parameters that adjust the spectral envelope and the tonality.

In SBR, as standardized in HE-AAC, all operations, which include the patching by means of simply copying, are always carried out inside the QMF-domain. However, other different patching methods can be carried out in different domains such as the FFT domain or the time domain. One might imagine to enabling SBR to alternatively choose a patching algorithm which operates either in the FFT domain or in the time domain, and needs an additional transformation for feeding the QMF analysis step.

In plain SBR, only one patching algorithm is available that takes into account neither needs of special hard-or software nor signal characteristics. Hence, SBR is not able to adapt the patching algorithm. One might imagine to simply choose between two distinct patching algorithms. Since the two patching methods work in different domains, the transition areas are prone to produce blocking artifacts, which makes fine-grain switching between both methods practically impossible.

WO 98/57436 discloses transposition methods used in spectral band replication, which are combined with spectral envelope adjustment.

WO 02/052545 teaches that signals can be classified either in pulse-train-like or non-pulse-train-like and based on this classification an adaptive switch transposer is proposed. The switch transposer performs two patching algorithms in parallel and the mixing unit combines both patched signals dependent on the classification (pulse-train or non-pulse-train). The actual switching between or mixing of the transposers is performed in an envelope-adjusting filterbank in response to envelope and control data. Furthermore, for pulse-train-like signals, the base signal is transformed into a filterbank domain, a frequency translating operation performed and an envelope adjustment of the result of the frequency translation is performed. This is a combined patching/further processing procedure. For non-pulse-train-like signals, a frequency domain transposer (FD transposer) is provided and the result of the frequency domain transposer is then transformed into the filterbank domain, in which the envelope adjustment is performed. Thus, implementation and flexibility of this procedure, which has in one alternative, a combined patching/further processing approach, and which has in the other alternative, the frequency domain transposer, which is positioned outside of the filterbank in which the envelope adjustment takes place is problematic with respect to flexibility and implementation possibilities.

SUMMARY

According to an embodiment, an apparatus for generating a synthesis audio signal using a patching control signal may have: a first converter for converting a time portion of an audio signal into a spectral representation; a spectral domain patch generator for performing a plurality of different spectral domain patching algorithms, wherein each patching algorithm generates a modified spectral representation having spectral components in an upper frequency band derived from corresponding spectral components in a core frequency band of the audio signal, and wherein the spectral domain patch generator is configured to select a first spectral domain patching algorithm from the plurality of patching algorithms for a first time portion and a second spectral domain patching algorithm from the plurality of patching algorithms for a second different time portion in accordance with the patching control signal to obtain the modified spectral representation; a high frequency reconstruction manipulator for manipulating the modified spectral representation or a signal derived from the modified spectral representation in accordance with a spectral band replication parameter to obtain a bandwidth extended signal; and a combiner for combining the audio signal having spectral components in the core frequency band or a signal derived from the audio signal with the bandwidth extended signal to obtain the synthesis audio signal.

According to another embodiment, an apparatus for encoding an audio signal, the audio signal having a core frequency band and an upper frequency band, may have: a core encoder for encoding the audio signal within the core frequency band; a parameter extractor for extracting a patching control signal from the audio signal, the patching control signal indicating a selected patching algorithm from a plurality of different spectral domain patching algorithms, the selected patching algorithm to be performed in a spectral domain for generating a synthesis audio signal in a bandwidth extension decoder; and a parameter calculator for calculating a spectral band replication parameter from the upper frequency band.

According to another embodiment, a method for generating a synthesis audio signal using a patching control signal may have the steps of converting a time portion of an audio signal into a spectral representation; performing a plurality of different spectral domain patching algorithms, wherein each patching algorithm generates a modified spectral representation having spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with the patching control signal to obtain the modified spectral representation; manipulating the modified spectral representation or a signal derived from the modified spectral representation in accordance with a spectral band replication parameter to obtain a bandwidth extended signal; and combining the audio signal having spectral components in the core frequency band or a signal derived from the audio signal with the bandwidth extended signal to obtain the synthesis audio signal.

According to another embodiment, a method for encoding an audio signal, the audio signal having a core frequency band and an upper frequency band, may have the steps of: encoding the audio signal within the core frequency band; extracting a patching control signal from the audio signal, the patching control signal indicating a selected patching algorithm from a plurality of different spectral domain patching algorithms, the selected patching algorithm to be performed in a spectral domain for generating a synthesis audio signal in a bandwidth extension decoder; and calculating a spectral band replication parameter from the upper frequency band.

According to another embodiment, an encoded audio signal may have: an encoded audio signal encoded within a core frequency band; a patching control signal, the patching control signal indicating a selected patching algorithm from a plurality of different spectral domain patching algorithms, the selected patching algorithm to be performed in a spectral domain for generating a synthesis audio signal in a bandwidth extension decoder; and a spectral band replication parameter calculated from an upper frequency band of the audio signal.

Another embodiment may have a computer program having a program code for performing the method for generating a synthesis audio signal using a patching control signal or the method for encoding an audio signal mentioned above, when the computer program is executed on a computer.

The present invention is based on the basic idea that the just-mentioned improved quality and/or efficient implementation may be achieved when a time portion of an audio signal is converted into a spectral representation before performing a plurality of different spectral domain patching algorithms, wherein each patching algorithm generates a modified spectral representation comprising spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with a patching control signal to obtain the modified spectral representation. By this measure, a reduced quality and/or flexibility due to a switching between two patching algorithms in different domains may be prevented and therefore the processing may be less complex while maintaining the perceptual quality.

Therefore, embodiments of the present invention relate to a concept for switching between at least two different spectral domain patching algorithms from a group of patching algorithms in the spectral domain. The group of patching algorithms may comprise a first patching algorithm comprising a harmonic transposition based on a single phase vocoder and non-harmonic copying-up SBR functionalities, a second patching algorithm comprising a harmonic transposition based on a multiple phase vocoder, a third patching algorithm comprising non-harmonic copying-up SBR functionalities and a fourth patching algorithm comprising a non-linear distortion. Furthermore, the bandwidth extension may be performed such that the bandwidth extended signal comprises the upper frequency band having a maximum frequency of at least four times the crossover frequency in the core frequency band.

As a result, by switching between the at least two different patching algorithms in the spectral domain, a reduced complexity at the same perceptual quality may be achieved such as within a bandwidth extension scenario.

Further embodiments of the present invention relate to an apparatus not comprising a time/frequency transformer for transforming a time domain signal derived from the modified spectral representation into the spectral domain. Therefore, embodiments allow that the high frequency reconstruction manipulator may be operative on the modified spectral representation directly without requiring a further transform (e.g. a QMF analysis) from the time domain to the spectral domain such as in case of a combined patching/further processing approach being operative in different domains.

Further embodiments of the present invention relate to a parameter extractor which is configured for determining from the plurality of different spectral domain patching algorithms a selected patching algorithm. Here, the selected patching algorithm is based on a comparison of the audio signal or a signal derived from the audio signal with a plurality of bandwidth extended signals having been obtained by performing the plurality of patching algorithms in the spectral domain and manipulating a modified spectral representation of a time portion of the audio signal. Therefore, embodiments provide a method of selecting the optimal patching algorithm for generating a synthesis audio signal in a bandwidth extension decoder.

Control parameters may be used to decide which patching is the most appropriate. To achieve this, an analysis-by-synthesis stage can be used; i.e. all patches can be applied and the best according to an objective is chosen. In an advantageous mode of the invention, the objective is to get the best perceptual quality of the restitution. In alternative modes, an objective function has to be optimized. For example, the objective may be to preserve the spectral flatness of the original HFs as close as possible.

On the one hand, the patching selection can be done only at the encoder by considering the original signal, the synthesized signal or the both of them. The decision (patching control signal) is then transmitted to the decoder. On the other hand, the selection may be performed synchronously at the encoder and decoder sides considering only the core bandwidth of the synthesized signal. The latter method does not need to generate additional side-information.

BRIEF DESCRIPTION OF THE DRAWINGS

In the following, embodiments of the present invention are explained with reference to the accompanying drawings, in which:

FIG. 1b shows a block diagram of an implementation of a spectral domain patch generator of FIG. 1a;

DETAILED DESCRIPTION OF THE INVENTION

Figure 1A:
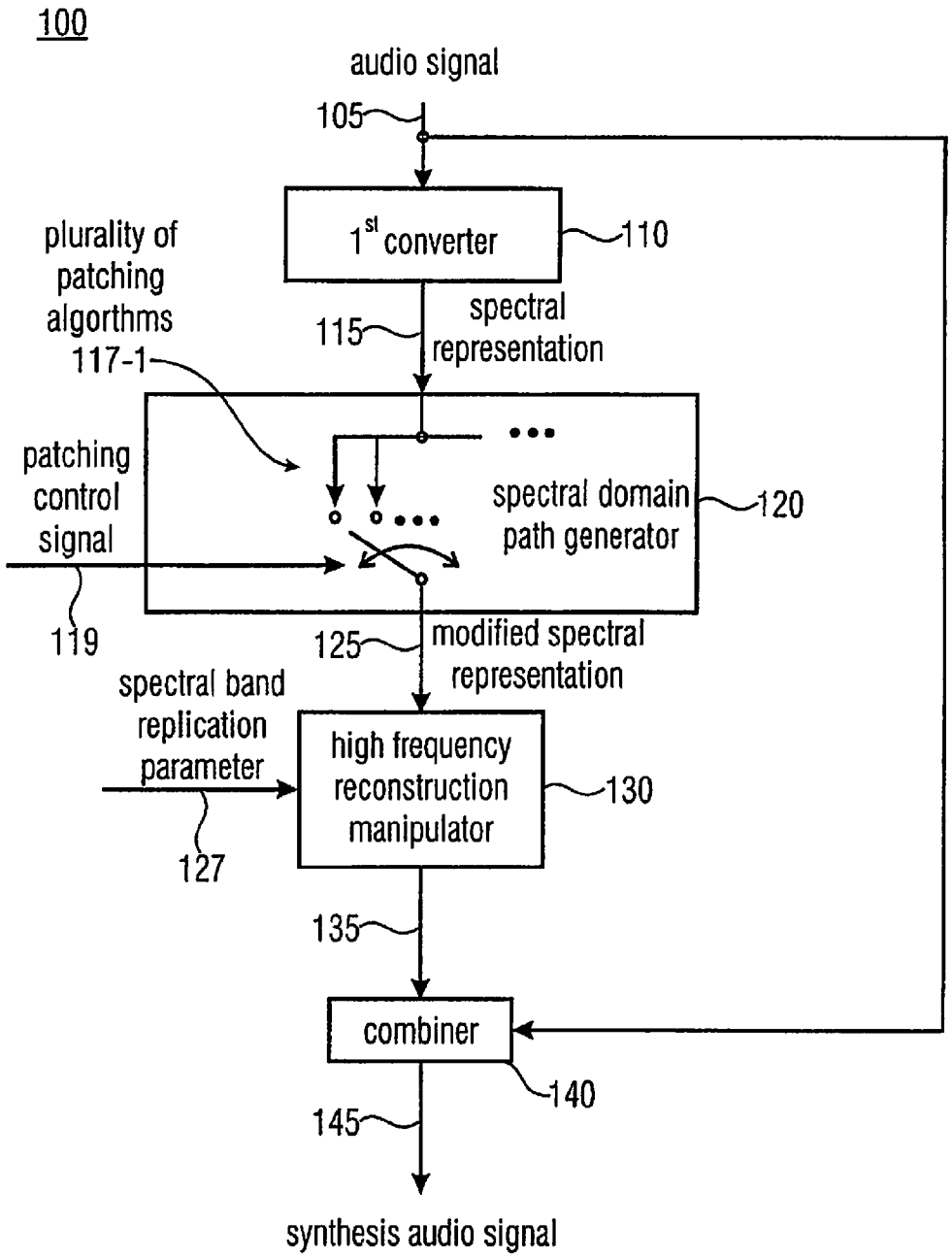
FIG. 1a shows a block diagram of an embodiment of an apparatus for generating a synthesis audio signal using a patching control signal.
Figure 1B:
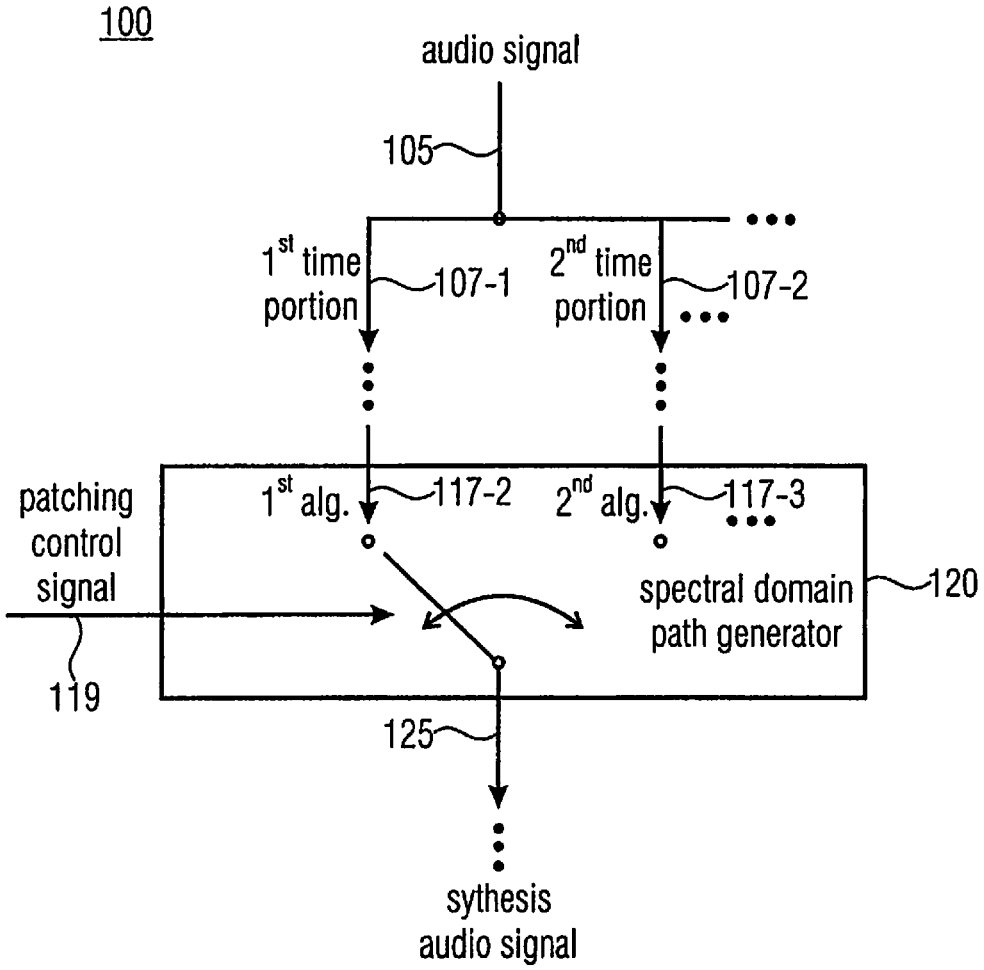

FIG. 1a shows a block diagram of an apparatus 100 for generating a synthesis audio signal 145 using a patching control signal 119 according to an embodiment of the present invention. The apparatus 100 comprises a first converter 110, a spectral domain patch generator 120, a high frequency reconstruction manipulator 130 and a combiner 140. The first converter 110 is configured for converting a time portion of an audio signal 105 into a spectral representation 115. The spectral domain patch generator 120 is configured for performing a plurality 117-1 of different spectral domain patching algorithms, wherein each patching algorithm generates a modified spectral representation 125 comprising spectral components in an upper frequency band derived from corresponding spectral components in a core frequency band of the audio signal 105. As shown in FIG. 1b the spectral domain patch generator 120 may be configured to select a first spectral domain patching algorithm 117-2 from the plurality 117-1 of patching algorithms for a first time portion 107-1 and a second spectral domain patching algorithm 117-3 from the plurality 117-1 of patching algorithms for a second different time portion 107-2 in accordance with the patching control signal 119 to obtain the modified spectral representation 125.

The high frequency reconstruction manipulator 130 is configured for manipulating the modified spectral representation 125 or a signal derived from the modified spectral representation 125 in accordance with a spectral band replication parameter 127 to obtain a bandwidth extended signal 135. The signal derived from the modified spectral representation 125 may, for example, be a signal in a QMF domain having been obtained after applying a QMF analysis to a modified time domain signal being based on the modified spectral representation 125. The combiner 140 is configured for combining the audio signal 105 having spectral components in the core frequency band or a signal derived from the audio signal 105 with the bandwidth extended signal 135 to obtain the synthesis audio signal 145. Here, the signal derived from the audio signal 105 may, for example, be a decoded low frequency signal having been obtained after decoding an encoded audio signal within the core frequency band.

As can be seen in FIG. 1a, the spectral domain patch generator 120 of the apparatus 100 is implemented to be operative in a spectral domain and not in a time domain.

Figure 2A:
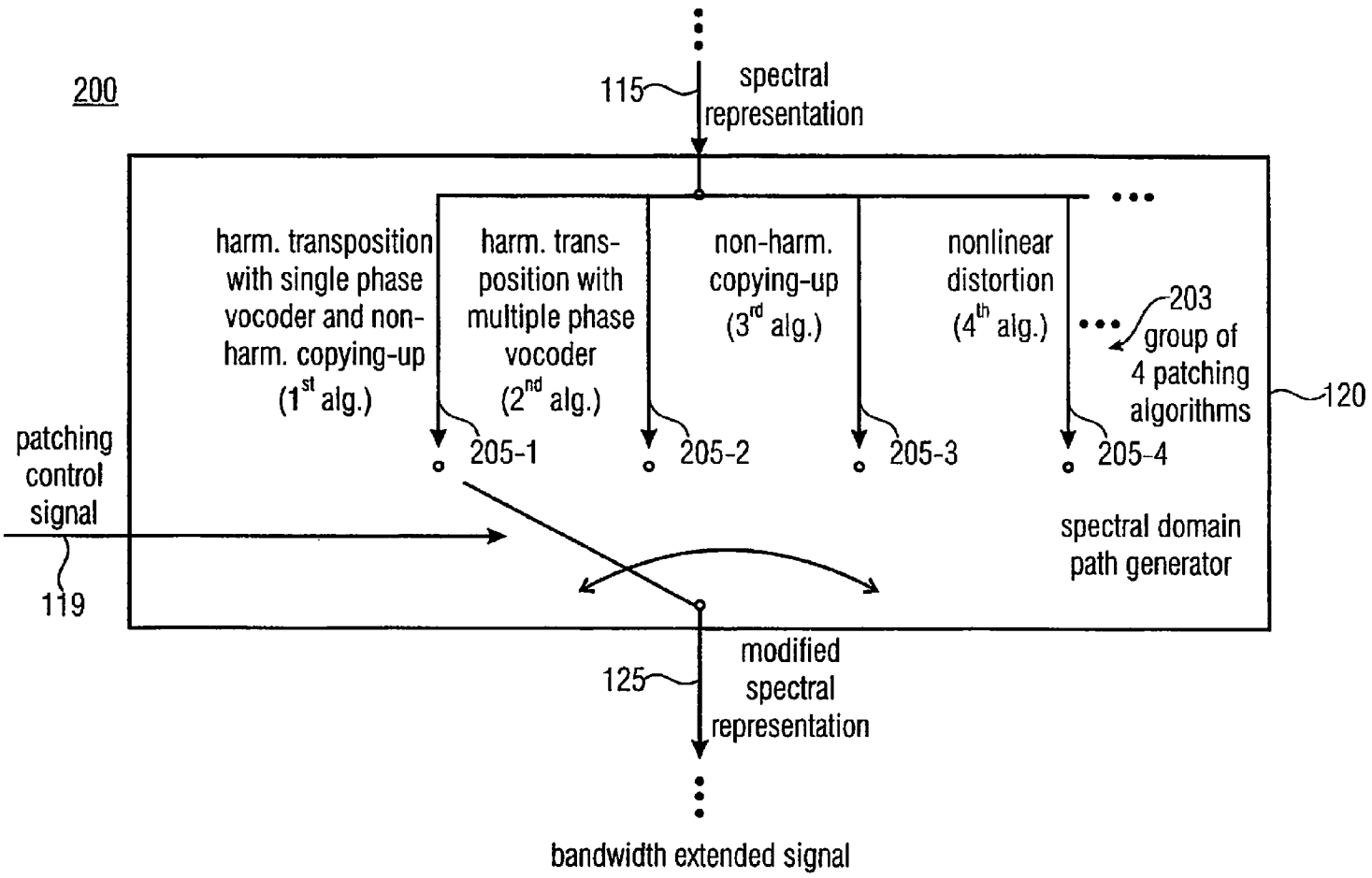
FIG. 2a shows a block diagram of a further embodiment of an apparatus for generating a synthesis audio signal.

FIG. 2a shows a block diagram of a further embodiment of an apparatus 200 for generating the synthesis audio signal 145. Here, the components of the apparatus 200 of FIG. 2a, which are the same as in the apparatus 100 of FIG. 1a, are omitted and not shown or described again. In the embodiment as shown in FIG. 2a, the spectral domain patch generator 120 of the apparatus 200 is configured for performing at least two different spectral domain patching algorithms from a group 203 of patching algorithms in the spectral domain. The group 203 of patching algorithms comprises a first patching algorithm 205-1 comprising a harmonic transposition based on a single phase vocoder and non-harmonic copying-up SBR functionalities, a second patching algorithm 205-2 comprising a harmonic transposition based on a multiple phase vocoder, a third patching algorithm 205-3 comprising non-harmonic copying-up SBR functionalities and a fourth patching algorithm 205-4 comprising a non-linear distortion.

Figure 2B:
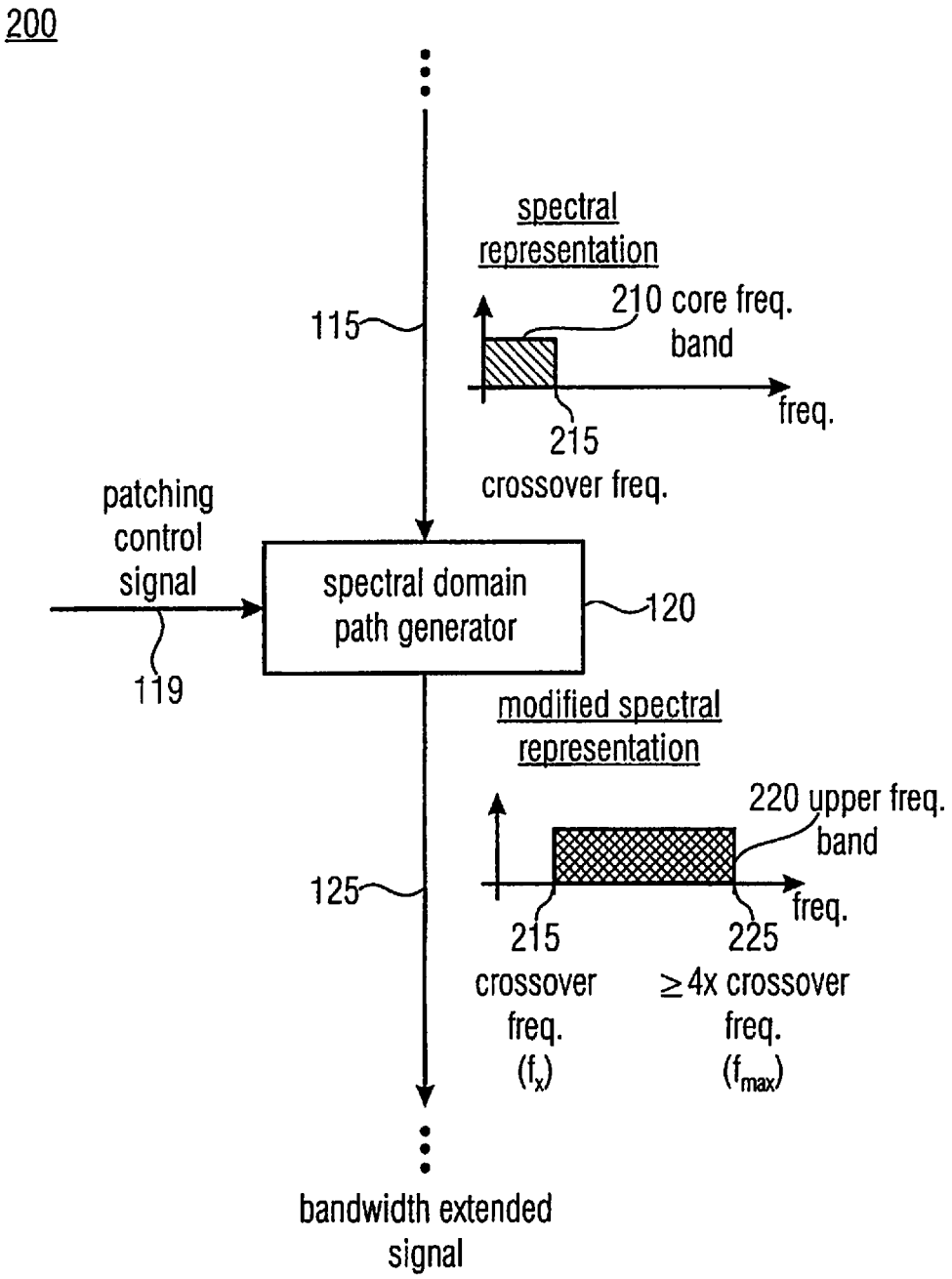
FIG. 2b shows a schematic illustration of a bandwidth extension scheme.

As shown in FIG. 2b, the apparatus 200 may be adapted for performing a bandwidth extension such that the bandwidth extended signal 135 comprises the upper frequency band 220 having a maximum frequency 225 of at least four times the crossover frequency 215 in the core frequency band 210. In the context of SBR, the typical value of the crossover frequency 215 defined as the highest frequency of the core frequency band 210 may, for example, be in a range below 4 kHz, 5 kHz or 6 kHz. Consequently, the maximum frequency 225 of the upper frequency band 220 may, for example, be about 16 kHz, 20 kHz or 24 kHz.

Figure 3:
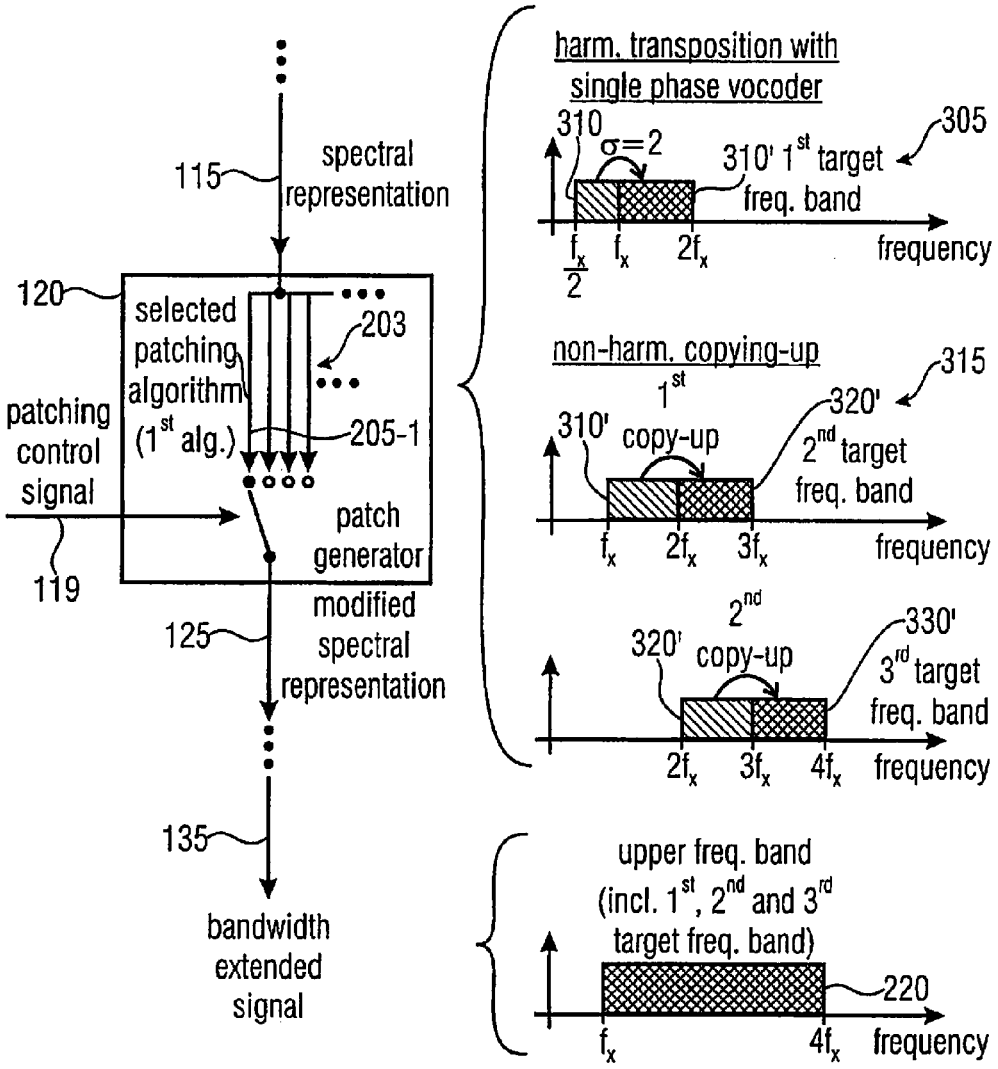
FIG. 3 shows a schematic illustration of an exemplary first patching algorithm.

FIG. 3 shows a schematic illustration of an exemplary first patching algorithm 205-1. In particular, the spectral domain patch generator 120 is configured for performing a selected patching algorithm from the at least two different spectral domain patching algorithms, the selected patching algorithm comprising the first patching algorithm 205-1. The first patching algorithm 205-1 comprises a harmonic transposition based on a single phase vocoder 305 comprising a bandwidth extension factor ($\sigma$) of two controlling a transform from a source frequency band 310 extracted from the core frequency band 210 into a first target frequency band 310'. Here, phases of the spectral components in the source frequency band 310 are multiplied by the bandwidth extension factor ($\sigma$) such that the first target frequency band 310 has frequencies ranging from the crossover frequency ($f_x$) to twice the crossover frequency ($f_x$). The first patching algorithm 205-1 further comprises non-harmonic copying-up SBR functionalities 315 for transforming spectral components in the first target frequency band 310' into a second target frequency band 320' by a first copying-up such that the second target frequency band 320' has frequencies ranging from twice the crossover frequency ($f_x$) to three times the crossover frequency ($f_x$) and for further transforming spectral components in the second target frequency band 320' into a third target frequency band 330' by a second copying-up such that the third target frequency band 330' has frequencies ranging from three times the crossover frequency ($f_x$) to four times the crossover frequency ($f_x$) included in the upper frequency band 220, the upper frequency band 220 comprising the first 310', second 320' and third 330' target frequency band. In particular, as shown in FIG. 3, the bandwidth extended signal 135 comprises the upper frequency band 220 generated from the core frequency band 210, wherein the upper frequency band 220 has a maximum frequency of four times the crossover frequency ($f_x$).

Figure 4:
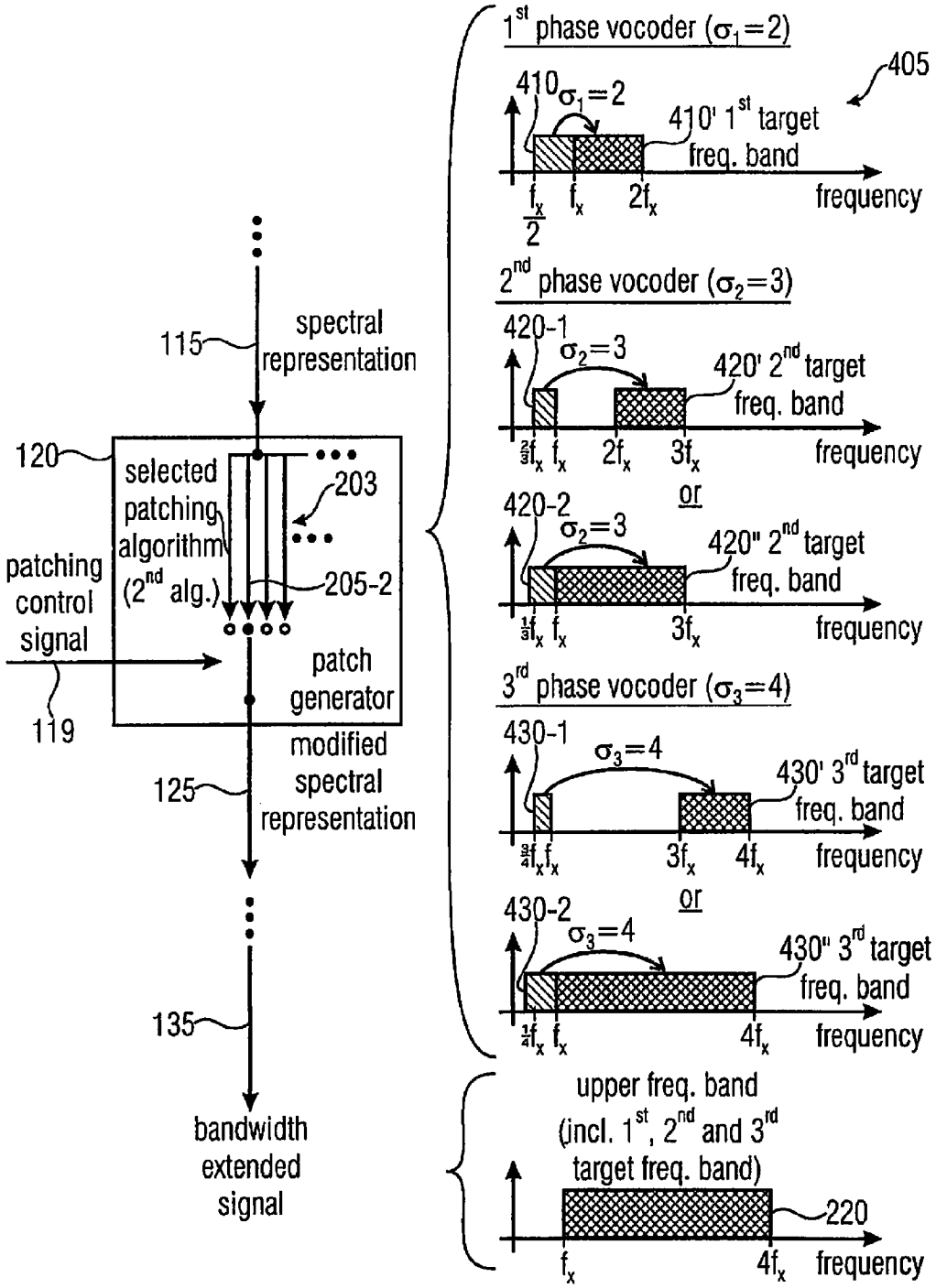
FIG. 4 shows a schematic illustration of an exemplary second patching algorithm.

FIG. 4 shows a schematic illustration of an exemplary second patching algorithm 205-2. Here in particular, the spectral domain patch generator 120 is configured for performing a selected patching algorithm from the at least two different spectral domain patching algorithms, the selected patching algorithm comprising the second patching algorithm 205-2. The second patching algorithm 205-2 comprises a harmonic transposition based on a multiple phase vocoder 405 comprising a first bandwidth extension factor ($\sigma_1$) of 2 controlling a transform from a first source frequency band 410 extracted from the core frequency band 210 into a first target frequency band 410'. Here, phases of the spectral components in the first source frequency band 410 are multiplied by the first bandwidth extension factor ($\sigma_1$) such that the first target frequency band 410' has frequencies ranging from the crossover frequency ($f_x$) to twice the crossover frequency ($f_x$). The second patching algorithm 205-2 further comprises a second bandwidth extension factor ($\sigma_2$) of 3 controlling a transform from a second source frequency band 420-1, 420-2 extracted from the core frequency band 210 into a second target frequency band 420', 420". Here, phases of the spectral components in the second source frequency band 420-1, 420-2 are multiplied by the second bandwidth extension factor ($\sigma_2$) such that the second target frequency band 420', 420" has frequencies ranging from twice the crossover frequency ($f_x$) to three times the crossover frequency ($f_x$) or ranging from the crossover frequency ($f_x$) to three times the crossover frequency ($f_x$), respectively. Finally, the second patching algorithm 205-2 further comprises a third bandwidth extension factor ($\sigma_3$) of 4 controlling a transform from a third source frequency band 430-1, 430-2 extracted from the core frequency band 210 into a third target frequency band 430', 430". Here, phases of the spectral components in the third source frequency band 430-1, 430-2 are multiplied by the third bandwidth extension factor ($\sigma_3$) such that the third target frequency band 430', 430" has frequencies ranging from three times the crossover frequency ($f_x$) to four times the crossover frequency ($f_x$) or ranging from the crossover frequency ($f_x$) to four times the crossover frequency ($f_x$) included in the upper frequency band 220, respectively. As in the first patching algorithm 205-1 shown in FIG. 3, the upper frequency band 220 of the bandwidth extended signal 135 comprises the first 410', second 420', 420" and third 430', 430" target frequency band having a maximum frequency of four times the crossover frequency ($f_x$).

Figure 5:
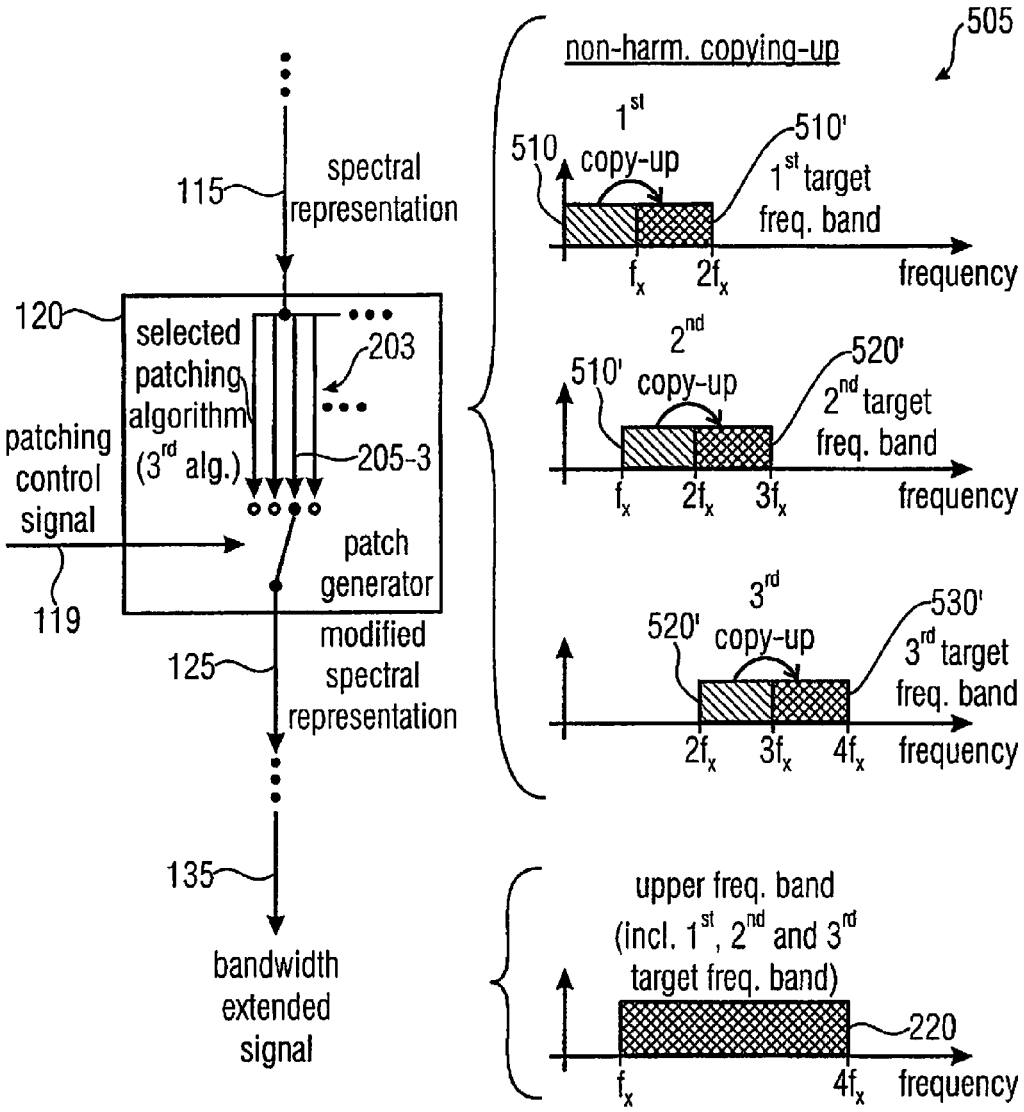
FIG. 5 shows a schematic illustration of an exemplary third patching algorithm.

FIG. 5 shows a schematic illustration of an exemplary third patching algorithm 205-3. In the embodiment of FIG. 5, the spectral domain patch generator 120 is configured for performing a select patching algorithm from the at least two different spectral domain patching algorithms, the selected patching algorithm comprising the third patching algorithm 205-3. The third patching algorithm 205-3 comprises non-harmonic copying-up SBR functionalities 505 for transforming spectral components in a source frequency band 510 being the core frequency band 210 into a target frequency band 510' by a first copying-up such that the first target frequency band 510' has frequencies ranging from the crossover frequency ($f_x$) to twice the crossover frequency ($f_x$). Spectral components in the first target frequency band 510' are further transformed into a second target frequency band 520' by a second copying-up such that the second target frequency band 520' has frequencies ranging from twice the crossover frequency ($f_x$) to three times the crossover frequency ($f_x$). Finally, spectral components in the second target frequency band 520' are further transformed into a third target frequency band 530' by a third copying-up such that the third target frequency band 530' has frequencies ranging from three times the crossover frequency ($f_x$) to four times the crossover frequency ($f_x$) included in the upper frequency band 220. Again, the upper frequency band 220 of the bandwidth extended signal 135 comprises the first 510', second 520' and third 530' target frequency band having a maximum frequency of four times the crossover frequency ($f_x$).

Figure 6:
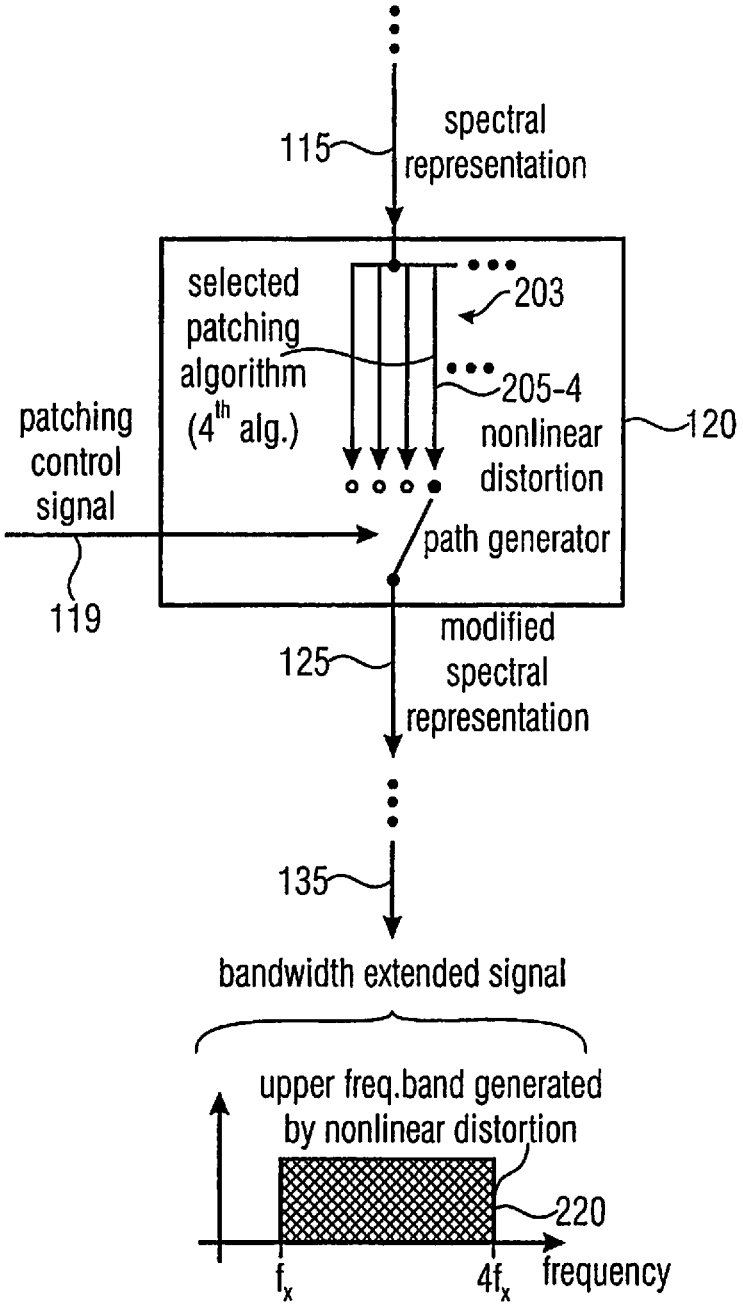
FIG. 6 shows a schematic illustration of an exemplary fourth patching algorithm.
Figure 7:
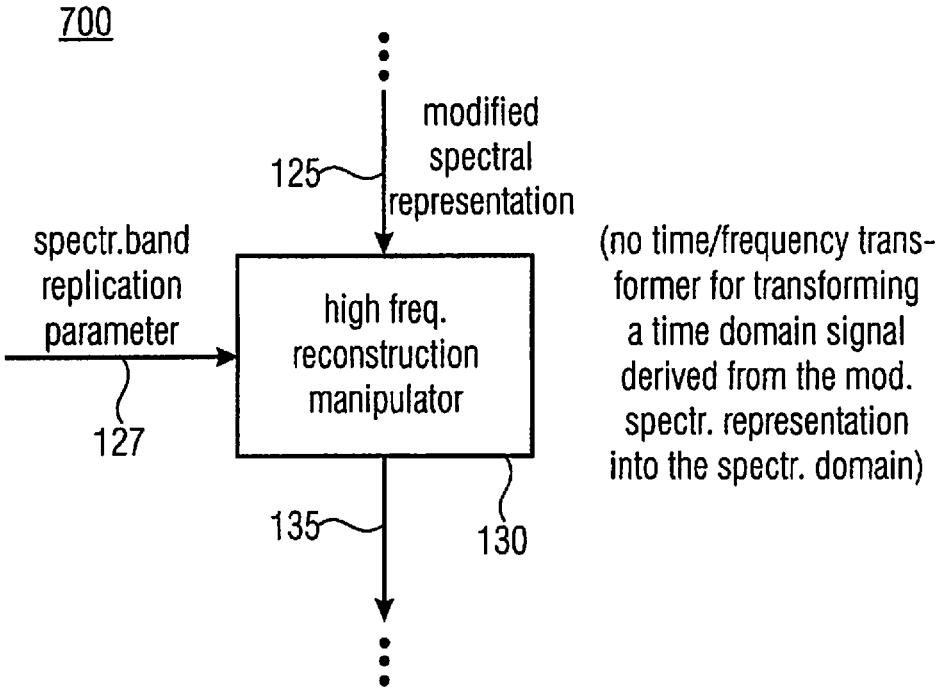
FIG. 7 shows a block diagram of an embodiment of FIG. 1a without a time/frequency transformer placed after the spectral domain patch generator.

FIG. 6 shows a schematic illustration of an exemplary fourth patching algorithm 205-4. In the embodiment of FIG. 6, the spectral domain patch generator 120 is configured for performing a selected patching algorithm from the at least two different spectral domain patching algorithms, the selected patching algorithm comprising the fourth patching algorithm 205-4. Here, the fourth patching algorithm 205-4 comprises a non-linear distortion for generating the spectral components in the upper frequency band 220 having frequencies ranging from the crossover frequency ($f_x$) to four times the crossover frequency ($f_x$).

Generally, in the embodiments of FIGS. 3-6 as described above, the spectral domain patching algorithms 205-1; 205-2; 205-3; 205-4 are performed with the spectral domain patch generator 120 being configured for transforming a spectral component in an initial band 310, 310', 320'; 410, 420-1, 420-2, 430-1, 430-2; 510, 510', 520' derived from the core frequency band 210 or an upper frequency band not included in the core frequency band 210 into a target spectral component in the upper frequency band 220 such that the target spectral component is different for each spectral domain patching algorithm.

In particular, the spectral domain patch generator 120 may comprise a band pass filter for extracting the initial band from the core frequency band 210 or the upper frequency band 220, wherein a band pass characteristic of the band pass filter may be selected such that the initial band will be transformed into a corresponding target frequency band 310', 320', 330'; 410', 420', 420", 430', 430"; 510', 520', 530' as shown in FIGS. 3-6.

The different spectral domain patching algorithms 205-1; 205-2; 205-3; 205-4 may be performed in accordance with a needed performance such as within the bandwidth extension scheme of FIG. 2b.

Specifically, by employing a single or multiple phase vocoder as shown for example in FIG. 3 or FIG. 4, respectively, the frequency structure is harmonically correctly extended to the high frequency domain, because the base band (e.g. the core frequency band 210) is spectrally spread by an even multiple (e.g. $\sigma_1=2$, $\sigma_2=3$, $\sigma_3=4$), and because spectral components in the base band are combined with the additional generated spectral components.

A phase vocoder based patching algorithm may be advantageous if the base band is already strongly limited in bandwidth, for example, by using only a very low bit rate. Hence, the reconstruction of the upper frequency components already starts at a relatively low frequency. The typical crossover frequency is, in this case, less than about 5 KHz (or even less than 4 KHz). In this region, the human ear is very sensitive to dissonances due to incorrectly positioned harmonics. This can result in the impression of "unnatural" tones. In addition, spectrally closely spaced tones (with the spectral dissonance of about 30 Hz to 300 Hz) are perceived as rough tones. The harmonic continuation of the frequency structure of the base band avoids these incorrect and unpleasant hearing impressions.

Furthermore, by employing non-harmonic copying-up SBR functionalities as shown, for example in FIG. 5, spectral regions may be sub-band wise copied to a higher frequency region or into the frequency region to be replicated. Also copying relies on the observation, which is true for all patching methods, that the spectral properties of the higher frequency signals are similar in many respects to the properties of the base band signals. There are only a very few deviations from each other. In addition, the human ear is typically not very sensitive at high frequency (typically starting at about 5 KHz), especially with respect to a non-precise spectral mapping. In fact, this is the key idea of the spectral band replication in general. Copying in particular, comprises the advantage that it is easy and fast to implement. This patching algorithm also has a high flexibility with respect to the borders of the patch, since the copying of the spectrum may be performed at any sub-band border.

Finally, the patching algorithm of non linear distortion (see, e.g. FIG. 6) may comprise a generation of harmonics by clipping, limiting, squaring, etc. If for example, a spread signal is spectrally very thinly occupied (e.g. after applying the above mentioned phase vocoder patching algorithm), it is possible that the spread spectrum can optionally be additively supplemented by a distorted signal in order to avoid unwanted frequency holes.

It is to be noted that besides the above mentioned patching algorithms from the group 203 of patching algorithms (see FIG. 2a), other patching algorithms within the spectral domain such as a spectral mirroring, may be performed.

The high frequency reconstruction manipulator 130 will receive as its input the modified spectral representation 125 and not a frequency domain signal 715, present at the output of such a time/frequency transformer 710.

The described configuration may be advantageous, because in the this case the further processing of the modified spectral representation 125 performed by the high frequency reconstruction manipulator 130 can readily take place in the same domain (e.g. the FFT or QMF domain) as the patching algorithm performed by the spectral domain patch generator 120 is operative in. Therefore, a further transform between different domains such as a transform from the time domain to the spectral domain (e.g. a QMF analysis) will not be required, leading to an easier implementation.

Figure 8:
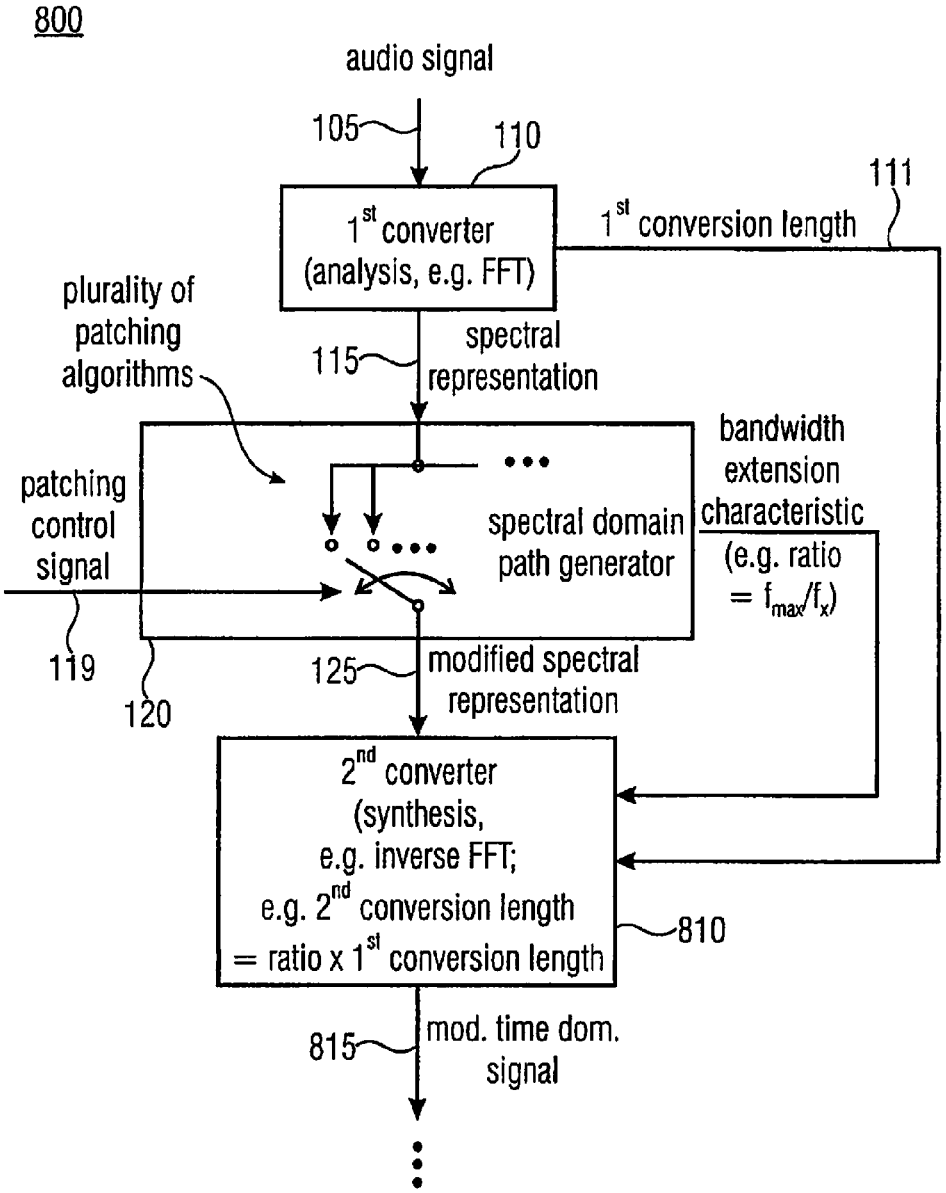
FIG. 8 shows a block diagram of an embodiment of FIG. 1a with a second converter (frequency/time converter)

In the embodiment of FIG. 8, an apparatus 800 is shown further comprising a second converter 810 for converting the modified spectral representation 125 into the time domain. Again, the components of the apparatus 800 of FIG. 8, which may correspond to those of the apparatus 100 of FIG. 1a, are omitted. As shown in FIG. 8, the second converter 810 may be adapted to apply a synthesis matched to an analysis applied by the first converter 110. Here, the first converter 110 is configured to perform a conversion having a first conversion length 111, while the second converter 810 is configured to perform a conversion having a second conversion length. In particular, the second conversion length may depend on a bandwidth extension characteristic in that a ratio of the maximum frequency ($F_{max}$) in the upper frequency band 220 and the crossover frequency ($f_x$) in the core frequency band 210 and the first conversion length 111 is accounted for.

In embodiments of the present invention, the first converter 110 may, for example, be implemented to perform a fast Fourier transform (FFT), a short-time Fourier transform (STFT), a discrete Fourier transform (DFT) or a QMF analysis, while the second converter 810 may, for example, be implemented to perform an inverse fast Fourier transform (IFFT), an inverse short-time Fourier transform (ISTFT), an inverse discrete Fourier transform (IDFT) or a QMF synthesis.

Specifically, the second conversion length may be chosen such that it will be equal to the ratio $f_{max}/f_x$ multiplied by the first conversion length 111. In this way, the second conversion length or frequency resolution applied by the second converter 810 will readily be adapted to the bandwidth extension characteristic of the bandwidth extension scheme as shown in FIG. 2b. This is because the bandwidth extension characteristic is essentially governed by the above ration ($f_{max}/f_x$) corresponding to a higher effective sampling rate according to Nyquist's principle.

Figure 9:
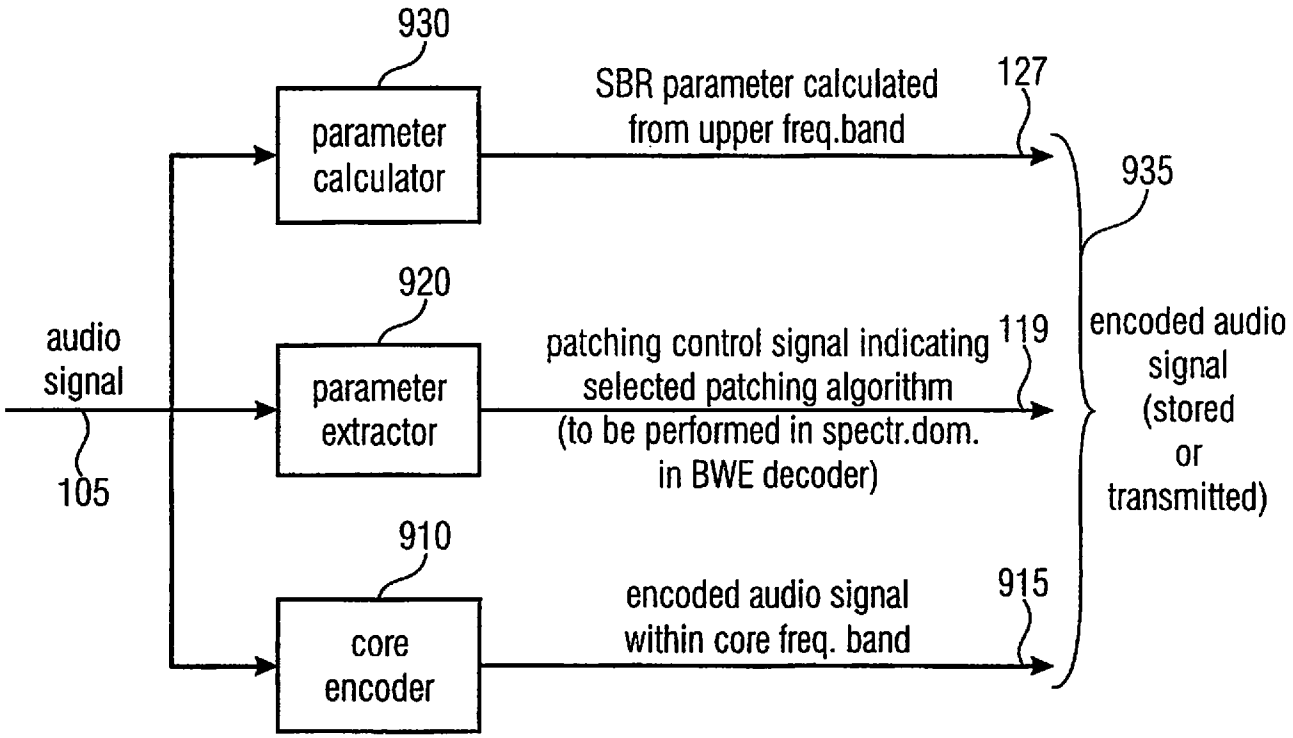
FIG. 9 shows a block diagram of an embodiment of an apparatus for encoding an audio signal.

FIG. 9 shows a block diagram of an embodiment of an apparatus 900 for encoding an audio signal 105. The audio signal 105 comprises a core frequency band 210 and an upper frequency band 220. In particular, the apparatus 900 for encoding comprises a core encoder 910, a parameter extractor 920 and a parameter calculator 930. The core encoder 910 is configured for encoding the audio signal 105 within the core frequency band 210 to obtain an encoded audio signal 915 encoded within the core frequency band 210. Furthermore, the parameter extractor 920 is configured for extracting a patching control signal 119 from the audio signal 105, the patching control signal 119 indicating a selected patching algorithm from a plurality 117-1 of different spectral domain patching algorithms. Specifically, the selected patching algorithm may be performed in a spectral domain for generating the synthesis audio signal in a bandwidth extension decoder. Finally, the parameter calculator 930 is configured for calculating a SBR parameter 127 from the upper frequency band 220. The SBR parameter 127 calculated from the upper frequency band 220, the patching control signal 119 indicating the selected patching algorithm and the encoded audio signal 915 encoded within the core frequency band 210 may constitute an encoded audio signal 935 to be stored or transmitted within a bit stream.

In the embodiment of FIG. 9, the parameter extractor 920 may be configured for analyzing the audio signal 105 or a signal derived from the audio signal 105 to determine the patching control signal 119 based on a signal characteristic of the analyzed signal. For example, the patching control signal 119 may indicate a first patching algorithm for a first time portion 107-1 of the analyzed signal being characterized as 'speech' and a second patching algorithm for a second time portion 107-2 of the analyzed signal being characterized as 'stationary music'.

Accordingly, in case of a speech signal, a processing based on a speech source model or an information generation model such as within a LPC (linear predictive coding) domain may be used, while in case of stationary music, a stationary source model or an information sink model may be used. While in the former case, the human speech/sound generation system generating sound is described, in the latter case, the human auditory system receiving sound is described.

In addition, a signal dependent processing scheme may be implemented by switching between a harmonic transposition for a time portion comprising a transient event and a non-harmonic copying-up operation for a time portion not comprising a transient event.

The above procedure corresponding to an open loop is based on a direct analysis of the audio signal 105 or a signal derived from the audio signal 105 with respect to its signal characteristic. Alternatively, the parameter extractor 920 may also be operative in a closed loop corresponding to an "analysis-by-synthesis" implementation.

Figure 10:
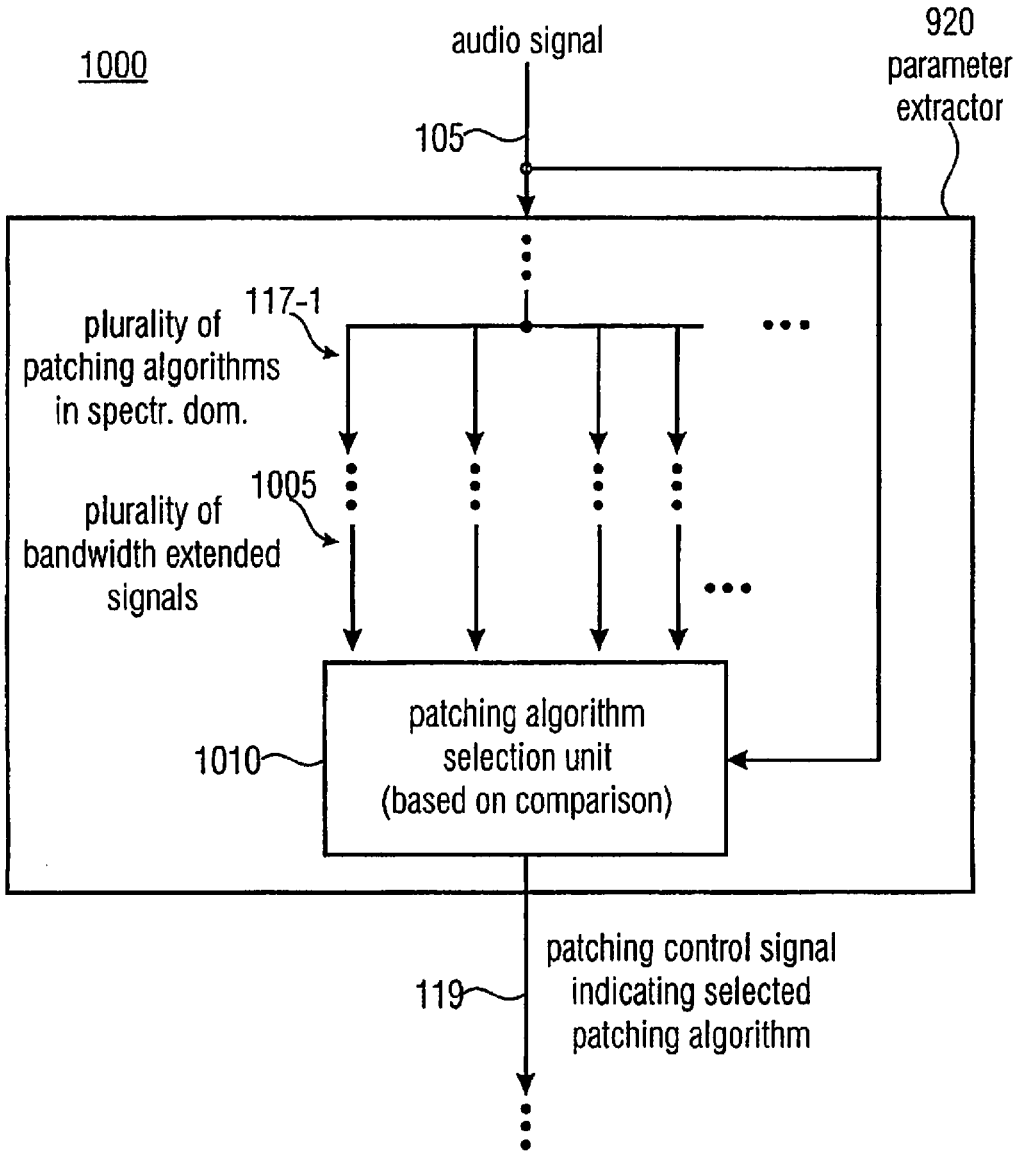
FIG. 10 shows a block diagram of a further embodiment of an apparatus for encoding an audio signal.

In the embodiment of FIG. 10, an apparatus 1000 for encoding an audio signal 105 within such an analysis-by-synthesis implementation is illustrated. Specifically, the parameter extractor 920 of the apparatus 1000 for encoding may be configured for determining from the plurality 117-1 of different spectral domain patching algorithm the selected patching algorithm. Here, the selected patching algorithm may be based on a comparison of the audio signal 105 or a signal derived from the audio signal 105 with the plurality 1005 of bandwidth extended signals having been obtained by performing the plurality 117-1 of patching algorithms in the spectral domain and manipulating a modified spectral representation 125 of a time portion of the audio signal 105. The comparison may, for example, be carried out by a patching algorithm selection unit 1010 by calculating spectral flatness measure (SFM) parameters ($SFM_{1005}$) from the plurality 1005 of bandwidth extended signals and the audio signal 105 ($SFM_{ref}$), comparing the calculated SFM parameters $SFM_{1005}$ and $SFM_{ref}$ and selecting from the plurality 117-1 of patching algorithms a specific (optimum) patching algorithm, for which a deviation in the compared SFM parameters is minimal. Finally, the selected optimum patching algorithm may be indicated by the patching control signal 119 present at the output of the parameter extractor 920.

Figure 11:
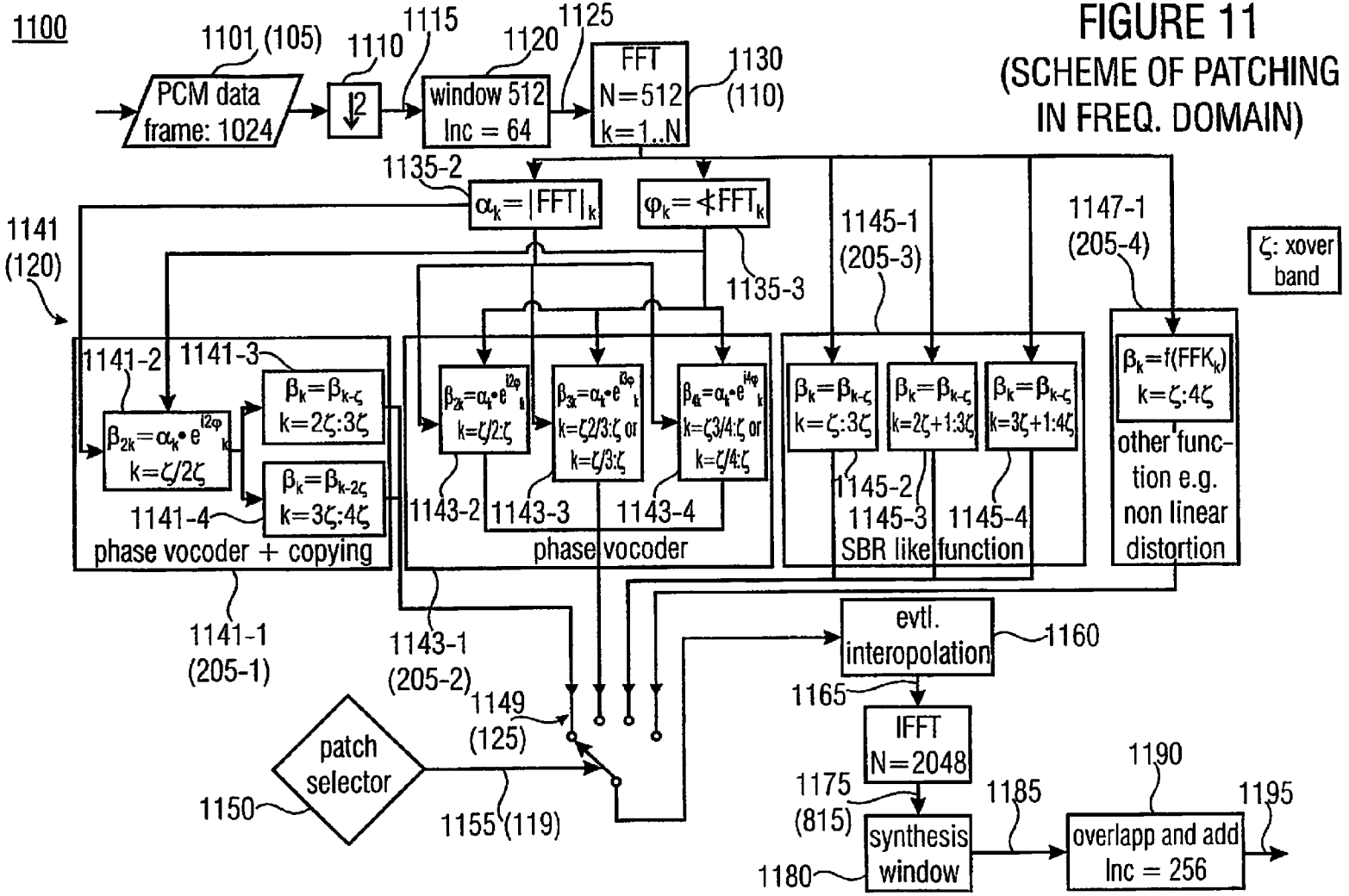
FIG. 11 shows an overview of an embodiment for a scheme of patching in a frequency domain.

FIG. 11 shows an overview of an embodiment for a scheme of patching in a frequency domain. In particular, an apparatus 1100 for generating a bandwidth extended signal such as within the bandwidth extension scheme of FIG. 2b is depicted. In the embodiment of FIG. 11, the audio signal 105 is represented by PCM (pulse code modulation) data 1101 having a frame length of 1024 samples ('frame: 1024'). The PCM data 1101 may, for example, be a decoded low frequency signal comprising a base band derived from the encoded audio signal 935, the encoded audio signal 935 having been transmitted from an apparatus for encoding, such as the encoder 900. Next, a down-sampler 1110 may be used for down-sampling the PCM data 1101 by a factor of 2, for example, to obtain a down-sampled signal 1115. The down-sampled signal 1115 is further supplied to an analysis windower 1120 indicated by a block denoted by "window" which may be configured to generate a plurality of overlapping windowed consecutive blocks of audio samples. Here, each block from the plurality of consecutive blocks may, for example, comprise 512 audio samples. In addition, a first time distance between two consecutive blocks of audio samples may, for example, be adjusted to correspond to 64 samples as denoted by "Inc=64". The overlap of the consecutive blocks of audio samples may furthermore be controlled by selecting a suitable (optimum) analysis window function from a plurality of different analysis window functions applied by the analysis windower 1120. A time portion 1125 of the audio signal 105, which may correspond to a consecutive block from the plurality of consecutive blocks of audio samples, is further supplied to the first converter 110 which may be implemented as, for example, an FFT processor 1130 having the first conversion length 111 of N=512. The FFT processor 1130 may be configured to convert the time portion 1125 into the spectral representation 115 which may, for example, be implemented in a polar form 1135-1. In particular, this spectral representation 1135-1 comprises magnitude information 1135-2 and phase information 1135-3 which is further processed by a spectral domain patch generator 1141, which may correspond to the spectral domain patch generator 120 of FIG. 2a. The spectral domain patch generator 1141 of FIG. 11 may comprise a first patching algorithm 1141-1 denoted by "phase vocoder plus copying" corresponding to the first patching algorithm 205-1, a second patching algorithm 1143-1 denoted by "phase vocoder" corresponding to the second patching algorithm 205-2, a third patching algorithm denoted by "SBR like function" corresponding to the third patching algorithm 205-3, and a fourth patching algorithm 1147-1 denoted by "other function, e.g. non linear distortion" corresponding to the fourth patching algorithm 205-4 from the group 203 of patching algorithms as shown in FIG. 2a.

As described correspondingly in the context of FIG. 2a before, the first patching algorithm 1141-1 comprises a single phase vocoder 1141-2 and non-harmonic copying-up functionalities 1141-3, 1141-4. Furthermore, the second patching algorithm 1143-1, which is based on a multiple phase vocoder operation comprises a first phase vocoder 1143-2, a second phase vocoder 1143-3 and a third vocoder 1143-4. Furthermore, the third patching algorithm 1145-1 comprises non-harmonic copying-up SBR functionalities performing a first copy-up operation 1145-2, a second copy-up operation 1145-3 and a third copy-up operation 1145-4. Finally, the fourth patching algorithm 1147-1 comprises a non linear distortion functionality.

Particularly, in the embodiment of FIG. 11, the sub-components of the patching algorithm blocks 1141-1, 1143-1, 1145-1, 1147-1 may correspond to those of the blocks 205-1, 205-2, 205-3, 205-4 of FIG. 2a. In addition, the symbol ζ ('xover band') may correspond to the crossover frequency ($f_x$).

Moreover, a patch selector 1150 may be used to provide a patching control signal 1155 corresponding to the patching control signal 119 for controlling the spectral domain patch generator 1141 such that at least two different spectral domain patching algorithms from the group 1141-1, 1143-1, 1145-1, 1147-1 of patching algorithms will be performed, leading to a modified spectral representation 1149 corresponding to the modified spectral representation 125.

The modified spectral representation 1149 may (optionally) be processed by a subsequent interpolator 1160 to obtain an interpolated modified spectral representation 1165. The interpolated modified spectral representation 1165 may then be supplied to the second converter 810, which may, for example, be implemented as an iFFT processor 1170 having a second conversion length of N=2048. Here, as described correspondingly in FIG. 8, the second conversion length of N=2048 is adjusted to be exactly four times higher than the first conversion length of N=512. Thus, the bandwidth extension characteristic of the bandwidth extension scheme as performed with the different spectral domain patching algorithms may be accounted for, which has been explained in detail before.

The iFFT processor 1170 may be configured for converting the interpolated modified spectral representation 1165 into a modified time domain signal 1175 corresponding to the modified time domain signal 815 of FIG. 8. The modified time domain signal 1175 may then be supplied to a synthesis windower 1180 for applying a synthesis window function to the modified time domain signal 1175 to obtain a modified windowed time domain signal 1185. Here, the synthesis window function is matched to the analysis window function such that the effect of applying the analysis window function is compensated for by applying the synthesis window function.

Since the modified windowed time domain signal 1185 has to be sampled at a higher effective sampling rate (e.g. 32 KHz) as compared to the original sampling rate (e.g. 8 KHz) due to the bandwidth extension, the modified windowed time domain signal 1185 may finally be overlap-added in a block 1190 denoted by "overlap and add" in that a ratio of a second time distance of, for example 256 samples, denoted by "Inc=256" applied by the block 1190 and the first time distance of, for example 64 samples, applied by the analysis windower 1120 (e.g. ratio=4) will be equal to the ratio of the higher effective sampling rate and the original sampling rate. In this way, an output signal 1195 may be obtained which has the same overlap characteristic as the original (down-sampled) signal 1115. The output signal 1195 provided by the apparatus 1100 may further be processed starting from the high frequency reconstruction manipulator 130 as shown in FIG. 1a to finally obtain a replicated signal extended in bandwidth.

It is to be noted that in the embodiment of FIG. 11, all different patching algorithms are carried out in the same domain, for instance in the frequency domain. The domain can be QMF domain as it is done in SBR or any other domain, such as Fourier transposed. The actual patch data generation can be carried out in a different domain. In that case, the entire patching, is however, carried out in the same domain.

Additionally different source models can be associated to the patching considered in the selection. For instance, a speech source model as used in speech bandwidth extension, as described in Frederik Nagel, Sascha Disch, "A harmonic bandwidth extension method for audio codecs," ICASSP International Conference on Acoustics, Speech and Signal Processing, IEEE CNF, Taipei, Taiwan, April 2009, can be chosen for speech signals, while a stationary source model can be adopted for stationary music. In the same way, as described before, transients may have their own model for the patching.

Furthermore, by means of overlapping analysis and synthesis windows for time-frequency transposition, smooth transitions between different patching schemes are guaranteed. Alternatively, special windows for analysis and synthesis can be used in order to make lower overlap possible.

In summary, in the FIG. 11 embodiment, the patching methods can be selected among a simple copy operation of neighbored frequency sections, a phase-vocoder based harmonic transposition scheme, and a phase-vocoder based harmonic transposition scheme which includes copying of neighbored frequency sections.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Dependent on certain implementation requirements of the inventive method, the inventive method can be implemented in hardware or in software. The implementation can be performed using a digital storage medium, in particular a disk, a DVD or a CD having electronically, readable control signals stored thereon, which cooperate with programmable computer systems, such that the inventive methods are performed. Generally, the present invention can therefore be implemented as a computer program product, with a program stored on a machine-readable carrier, the program code being operated for performing the inventive methods when the computer program product runs on a computer. In other words, the inventive methods are, therefore, a computer program having a program code for performing at least one of the inventive methods when the computer program runs on a computer. The inventive encoded audio signal can be stored on any machine-readable storage medium, such as a digital storage medium.

Embodiments of the present invention allow the bandwidth extension to take into account sound, hardware, and signal characteristics for the patching process. The decision for the best suited patching can be done within an open or a closed loops. Therefore, the restitution quality can be controlled and enhanced.

The presented concept has also the advantage that a smooth transition between the different patching algorithms can be reached easily, permitting a fast and accurate adaption of the bandwidth extension based upon the signal.

Most prominent applications are audio decoders, which are often implemented on hand-held devices and thus operate on a battery power supply.

While this invention has been described in terms of several embodiments, there are alterations, permutations and equivalents which fall in the scope of this invention. It should also be noted that there are many alternative ways of implementing the illumination apparatus and the illumination system as described herein. It is therefore intended that the following depending claims are interpreted as including all such alterations, permutations and equivalents as fall within the true spirit and scope of the present invention.

The invention claimed is:

[1. An apparatus for generating a synthesis audio signal using a patching control signal, the apparatus comprising:

a first converter for converting a time portion of an audio signal into a spectral representation;

a spectral domain patch generator for performing a plurality of different spectral domain patching algorithms, wherein each patching algorithm generates a modified spectral representation comprising spectral components in an upper frequency band derived from corresponding spectral components in a core frequency band of the audio signal, and wherein the spectral domain patch generator is configured to select a first spectral domain patching algorithm from the plurality of patching algorithms for a first time portion and a second spectral domain patching algorithm from the plurality of patching algorithms for a second different time portion in accordance with the patching control signal to achieve the modified spectral representation;

a high frequency reconstruction manipulator for manipulating the modified spectral representation or a signal derived from the modified spectral representation in accordance with a spectral band replication parameter to achieve a bandwidth extended signal; and a combiner for combining the audio signal comprising spectral components in the core frequency band or a signal derived from the audio signal with the bandwidth extended signal to achieve the synthesis audio signal, wherein the spectral domain patch generator is configured for performing at least two different spectral domain patching algorithms from a group of patching algorithms in the spectral domain, the group of patching algorithms comprising a first patching algorithm comprising a harmonic transposition based on a single phase vocoder and non-harmonic copying-up spectral band replication functionalities, a second patching algorithm comprising a harmonic transposition based on a multiple phase vocoder, a third patching algorithm comprising non-harmonic copying-up spectral band replication functionalities and a fourth patching algorithm comprising a non-linear distortion, and wherein at least one of the first converter, the spectral domain patch generator, the high frequency reconstruction manipulator and the combiner comprises a hardware implementation.]

[2. The apparatus in accordance with claim 1, in which the spectral domain patch generator is implemented to be operative in a spectral domain and not in a time domain.]

[3. The apparatus in accordance with claim 1, wherein the spectral domain patch generator is configured for performing a selected patching algorithm from the at least two different spectral domain patching algorithms, the selected patching algorithm comprising the first patching algorithm, the first patching algorithm comprising a harmonic transposition based on a single phase vocoder comprising a bandwidth extension factor of two controlling a transform from a source frequency band extracted from the core frequency band into a first target frequency band, wherein phases of the spectral components in the source frequency band are multiplied by the bandwidth extension factor such that the first target frequency band comprises frequencies ranging from the crossover frequency to twice the crossover frequency, the first patching algorithm further comprising non-harmonic copying-up spectral band replication functionalities for transforming spectral components in the first target frequency band into a second target frequency band by a first copying-up such that the second target frequency band comprises frequencies ranging from twice the crossover frequency to three times the crossover frequency and for further transforming spectral components in the second target frequency band into a third target frequency band by a second copying-up such that the third target frequency band comprises frequencies ranging from three times the crossover frequency to four times the crossover frequency comprised in the upper frequency band, the upper frequency band comprising the first, second and third target frequency band.]

[4. The apparatus in accordance with claim 1, wherein the spectral domain patch generator is configured for performing a selected patching algorithm from the at least two different spectral domain patching algorithms, the selected patching algorithm comprising the second patching algorithm, the second patching algorithm comprising a harmonic transposition based on a multiple phase vocoder comprising a first bandwidth extension factor of two controlling a transform from a first frequency band extracted from the core frequency band into a first target frequency band, wherein phases of the spectral components in the first source frequency band are multiplied by the first bandwidth extension factor such that the first target frequency band comprises frequencies ranging from the crossover frequency to twice the crossover frequency, the second patching algorithm further comprising a second bandwidth extension factor of three controlling a transform from a second source frequency band extracted from the core frequency band into a second target frequency band, wherein phases of the spectral components in the second source frequency band are multiplied by the second bandwidth extension factor such that the second target frequency band comprises frequencies ranging from twice the crossover frequency to three times the crossover frequency or ranging from the crossover frequency to three time the crossover frequency, the second patching algorithm further comprising a third bandwidth extension factor of four controlling a transform from a third source frequency band extracted from the core frequency band into a third target frequency band, wherein phases of the spectral components in the third source frequency band are multiplied by the third bandwidth extension factor such that the third target frequency band comprises frequencies ranging from three times the crossover frequency to four times the crossover frequency or ranging from the crossover frequency to four times the crossover frequency comprised in the upper frequency band, the upper frequency comprising the first, second and third target frequency band.]

[5. The apparatus in accordance with claim 1, wherein the spectral domain patch generator is configured for performing a selected patching algorithm from the at least two different spectral domain patching algorithms, the selected patching algorithm comprising the third patching algorithm, the third patching algorithm comprising non-harmonic copying-up spectral band replication functionalities for transforming spectral components in a source frequency band being the core frequency band into a first target frequency band by a first copying-up such that the first target frequency band comprises frequencies ranging from the crossover frequency to twice the crossover frequency, for further transforming spectral components in the first target frequency band into a second target frequency band by a second copying-up such that the second target frequency band comprises frequencies ranging from twice the crossover frequency to three times the crossover frequency and for further transforming spectral components in the second target frequency band into a third target frequency band by a third copying-up such that the third target frequency band comprises frequencies ranging from three times the crossover frequency to four times the crossover frequency comprised in the upper frequency band, the upper frequency band comprising the first, second and third target frequency band.]

[6. The apparatus in accordance with claim 1, wherein the spectral domain patch generator is configured for performing a selected patching algorithm from the at least two different spectral domain patching algorithms, the selected patching algorithm comprising the fourth patching algorithm, the fourth patching algorithm comprising a non-linear distortion for generating the spectral components in the upper frequency band comprising frequencies ranging from the crossover frequency to four times the crossover frequency.]

[7. The apparatus according to claim 1, the apparatus further comprising a second converter for converting the modified spectral representation into the time domain, wherein the second converter is adapted to apply a synthesis matched to an analysis applied by the first converter, wherein the first converter is configured to perform a conversion comprising a first conversion length, and wherein the second converter is configured to perform a conversion comprising a second conversion length, the second conversion length depending on a bandwidth extension characteristic in that a ratio of the maximum frequency in the upper frequency band and the crossover frequency in the core frequency band and the first conversion length is accounted for.]

[8. An apparatus for encoding an audio signal, the audio signal comprising a core frequency band and an upper frequency band, the apparatus comprising:

a core encoder for encoding the audio signal within the core frequency band;

a parameter extractor for extracting a patching control signal from the audio signal, the patching control signal indicating a selected patching algorithm from a plurality of different spectral domain patching algorithms, the selected patching algorithm to be performed in a spectral domain for generating a synthesis audio signal in a bandwidth extension decoder; and a parameter calculator for calculating a spectral band replication parameter from the upper frequency band, wherein the parameter extractor is configured for performing the plurality of patching algorithms in the spectral domain and manipulating a modified spectral representation of a time portion of the audio signal to obtain a plurality of bandwidth extended signals, for comparing the audio signal or a signal derived from the audio signal with the plurality of bandwidth extended signals, and for determining from the plurality of different spectral domain patching algorithms the selected patching algorithm based on the comparing, and wherein at least one of the core encoder, the parameter extractor and the parameter calculator comprises a hardware implementation.]

[9. A method for generating a synthesis audio signal using a patching control signal, the method comprising:

converting a time portion of an audio signal into a spectral representation;

performing a plurality of different spectral domain patching algorithms, wherein each patching algorithm generates a modified spectral representation comprising spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with the patching control signal to achieve the modified spectral representation;

manipulating the modified spectral representation or a signal derived from the modified spectral representation in accordance with a spectral band replication parameter to achieve a bandwidth extended signal; and combining the audio signal comprising spectral components in the core frequency band or a signal derived from the audio signal with the bandwidth extended signal to achieve the synthesis audio signal, wherein the spectral domain patch generator is configured for performing at least two different spectral domain patching algorithms from a group of patching algorithms in the spectral domain, the group of patching algorithms comprising a first patching algorithm comprising a harmonic transposition based on a single phase vocoder and non-harmonic copying-up spectral band replication functionalities, a second patching algorithm comprising a harmonic transposition based on a multiple phase vocoder, a third patching algorithm comprising non-harmonic copying-up spectral band replication functionalities and a fourth patching algorithm comprising a non-linear distortion.]

[10. A method for encoding an audio signal, the audio signal comprising a core frequency band and an upper frequency band, the method comprising:

encoding the audio signal within the core frequency band;

extracting a patching control signal from the audio signal, the patching control signal indicating a selected patching algorithm from a plurality of different spectral domain patching algorithms, the selected patching algorithm to be performed in a spectral domain for generating a synthesis audio signal in a bandwidth extension decoder; and calculating a spectral band replication parameter from the upper frequency band, wherein the extracting comprises:

performing the plurality of patching algorithms in the spectral domain and manipulating a modified spectral representation of a time portion of the audio signal to obtain a plurality of bandwidth extended signals, comparing the audio signal or a signal derived from the audio signal with the plurality of bandwidth extended signals, and determining from the plurality of different spectral domain patching algorithms the selected patching algorithm based on the comparing.]

[11. A non-transitory storage medium having stored thereon a computer program comprising a program code for performing a method for generating a synthesis audio signal using a patching control signal, when the computer program is executed on a computer, the method comprising: converting a time portion of an audio signal into a spectral representation; performing a plurality of different spectral domain patching algorithms, wherein each patching algorithm generates a modified spectral representation comprising spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with the patching control signal to achieve the modified spectral representation; manipulating the modified spectral representation or a signal derived from the modified spectral representation in accordance with a spectral band replication parameter to achieve a bandwidth extended signal; and combining the audio signal comprising spectral components in the core frequency band or a signal derived from the audio signal with the bandwidth extended signal to achieve the synthesis audio signal, wherein the spectral domain patch generator is configured for performing at least two different spectral domain patching algorithms from a group of patching algorithms in the spectral domain, the group of patching algorithms comprising a first patching algorithm comprising a harmonic transposition based on a single phase vocoder and non-harmonic copying-up spectral band replication functionalities, a second patching algorithm comprising a harmonic transposition based on a multiple phase vocoder, a third patching algorithm comprising non-harmonic copying-up spectral band replication functionalities and a fourth patching algorithm comprising a non-linear distortion.]

[12. A non-transitory storage medium having stored thereon a computer program comprising a program code for performing a method for encoding an audio signal, when the computer program is executed on a computer, the audio signal comprising a core frequency band and an upper frequency band, the method comprising: encoding the audio signal within the core frequency band; extracting a patching control signal from the audio signal, the patching control signal indicating a selected patching algorithm from a plurality of different spectral domain patching algorithms, the selected patching algorithm to be performed in a spectral domain for generating a synthesis audio signal in a bandwidth extension decoder; and calculating a spectral band replication parameter from the upper frequency band wherein the extracting comprises: performing the plurality of patching algorithms in the spectral domain and manipulating a modified spectral representation of a time portion of the audio signal to obtain a plurality of bandwidth extended signals, comparing the audio signal or a signal derived from the audio signal with the plurality of bandwidth extended signals, and determining from the plurality of different spectral domain patching algorithms the selected patching algorithm based on the comparing.]

*13. A method for generating a synthesis audio signal using a patching control signal, the method comprising:*

*converting a time portion of an audio signal into a spectral representation;*

*performing, by a spectral domain patch generator, a plurality of different spectral domain patching algorithms, wherein each patching algorithm generates a modified spectral representation comprising spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with the patching control signal to achieve the modified spectral representation;*

*manipulating the modified spectral representation or a signal derived from the modified spectral representation in accordance with a spectral band replication parameter to achieve a bandwidth extended signal; and*

*combining the audio signal comprising spectral components in the core frequency band or a signal derived from the audio signal with the bandwidth extended signal to achieve the synthesis audio signal,*

*wherein the spectral domain patch generator is configured for performing two different spectral domain patching algorithms from a group of patching algorithms in the spectral domain, the group of patching algorithms comprising a first patching algorithm comprising a harmonic transposition based on a multiple phase vocoder and a second patching algorithm comprising non-harmonic copying-up spectral band replication functionalities, and*

*wherein the method is adapted for performing a bandwidth extension such that the bandwidth extended signal comprises the upper frequency band having a maximum frequency of at least four times a crossover frequency of the core frequency band.*

*14. A non-transitory storage medium having stored thereon a computer program comprising a program code for performing a method for generating a synthesis audio signal using a patching control signal, when the computer program is executed on a computer, the method comprising: converting a time portion of an audio signal into a spectral representation; performing, by a spectral domain patch generator, a plurality of different spectral domain patching*

*algorithms, wherein each patching algorithm generates a modified spectral representation comprising spectral components in an upper frequency band derived from corresponding spectral components in a core frequency band of the audio signal, and selecting a first spectral domain patching algorithm from the plurality of patching algorithms for a first time portion and a second spectral domain patching algorithm from the plurality of patching algorithms for a second different time portion in accordance with the patching control signal to achieve the modified spectral representation; manipulating the modified spectral representation or a signal derived from the modified spectral representation in accordance with a spectral band replication parameter to achieve a bandwidth extended signal; and combining the audio signal comprising spectral components in the core frequency band or a signal derived from the audio signal with the bandwidth extended signal to achieve the synthesis audio signal, wherein the spectral domain patch generator is configured for performing two different spectral domain patching algorithms from a group of patching algorithms in the spectral domain, the group of patching algorithms comprising a first patching algorithm comprising a harmonic transposition based on a multiple phase vocoder and a second patching algorithm comprising non-harmonic copying-up spectral band replication functionalities and wherein the method is adapted for performing a bandwidth extension such that the bandwidth extended signal comprises the upper frequency band having a maximum frequency of at least four times a crossover frequency of the core frequency band.*

*15. The method in accordance with claim 13, in which the performing the plurality of different spectral domain patching algorithms is implemented to be operative in a spectral domain and not in a time domain.*

*16. The method in accordance with claim 13, wherein the performing the plurality of different spectral domain patching algorithms comprises performing a selected patching algorithm from the at least two different spectral domain patching algorithms, the selected patching algorithm comprising the first patching algorithm, the first patching algorithm comprising a harmonic transposition based on a multiple phase vocoder comprising a first bandwidth extension factor of two controlling a transform from a first frequency band extracted from the core frequency band into a first target frequency band, wherein phases of the spectral components in the first source frequency band are multiplied by the first bandwidth extension factor such that the first target frequency band comprises frequencies ranging from the crossover frequency to twice the crossover frequency, the first patching algorithm further comprising a second bandwidth extension factor of three controlling a transform from a second source frequency band extracted from the core frequency band into a second target frequency band, wherein phases of the spectral components in the second source frequency band are multiplied by the second bandwidth extension factor such that the second target frequency band comprises frequencies ranging from twice the crossover frequency to three times the crossover frequency or ranging from the crossover frequency to three time the crossover frequency, the first patching algorithm further comprising a third bandwidth extension factor of four controlling a transform from a third source frequency band extracted from the core frequency band into a third target frequency band, wherein phases of the spectral components in the third source frequency band are multiplied by the third bandwidth extension factor such that the third target frequency band comprises frequencies ranging from three times the crossover frequency to four times the crossover frequency or ranging from the crossover frequency to four times the crossover frequency comprised in the upper frequency band, the upper frequency comprising the first, second and third target frequency band.*

*17. The method in accordance with claim 13, wherein the performing the plurality of different spectral domain patching algorithms comprises performing a selected patching algorithm from the at least two different spectral domain patching algorithms, the selected patching algorithm comprising the second patching algorithm, the second patching algorithm comprising non-harmonic copying-up spectral band replication functionalities for transforming spectral components in a source frequency band being the core frequency band into a first target frequency band by a first copying-up such that the first target frequency band comprises frequencies ranging from the crossover frequency to twice the crossover frequency, for further transforming spectral components in the first target frequency band into a second target frequency band by a second copying-up such that the second target frequency band comprises frequencies ranging from twice the crossover frequency to three times the crossover frequency and for further transforming spectral components in the second target frequency band into a third target frequency band by a third copying-up such that the third target frequency band comprises frequencies ranging from three times the crossover frequency to four times the crossover frequency comprised in the upper frequency band, the upper frequency band comprising the first, second and third target frequency band.*

*18. The method according to claim 13, the method further comprising second converting the modified spectral representation into the time domain, wherein the second converting comprises applying a synthesis matched to an analysis applied by the converting, wherein the converting comprises performing a conversion comprising a first conversion length, and wherein the second converting comprises performing a conversion comprising a second conversion length, the second conversion length depending on a bandwidth extension characteristic in that a ratio of the maximum frequency in the upper frequency band and the crossover frequency in the core frequency band and the first conversion length is accounted for.*

* * * * *